United States Patent
Sakiyama et al.

(10) Patent No.: US 9,578,084 B2
(45) Date of Patent: Feb. 21, 2017

(54) INFORMATION PROCESSING SYSTEM FOR STARTING UP A BROWSER, USER TERMINAL, INFORMATION PROCESSING DEVICE, AND NON-TRANSITORY COMPUTER READABLE RECORDING MEDIUM

(71) Applicants: Daisuke Sakiyama, Kawanishi (JP); Masami Yamada, Sennan-gun (JP); Atsushi Ohshima, Amagasaki (JP); Keisuke Teramoto, Itami (JP); Atsushi Tamura, Amagasaki (JP); Yukina Hisada, Toyokawa (JP)

(72) Inventors: Daisuke Sakiyama, Kawanishi (JP); Masami Yamada, Sennan-gun (JP); Atsushi Ohshima, Amagasaki (JP); Keisuke Teramoto, Itami (JP); Atsushi Tamura, Amagasaki (JP); Yukina Hisada, Toyokawa (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 241 days.

(21) Appl. No.: 13/788,577

(22) Filed: Mar. 7, 2013

(65) Prior Publication Data

US 2013/0246509 A1   Sep. 19, 2013

(30) Foreign Application Priority Data

Mar. 14, 2012   (JP) .................................. 2012-057389

(51) Int. Cl.
*G06F 15/16* (2006.01)
*H04L 29/08* (2006.01)
(Continued)

(52) U.S. Cl.
CPC ........... *H04L 67/025* (2013.01); *G06F 3/1203* (2013.01); *G06F 3/1222* (2013.01); *G06F 3/1238* (2013.01);
(Continued)

(58) Field of Classification Search
CPC ..................................................... H04L 67/025
(Continued)

(56) References Cited

U.S. PATENT DOCUMENTS 6,026,437 A *   2/2000   Muschett et al. ............. 709/219
7,587,467 B2 *   9/2009   Hesselink ............... H04L 67/06
                                                                709/214
(Continued)

FOREIGN PATENT DOCUMENTS

JP   2000-196799 A   7/2000
JP   2002-086847 A   3/2002
(Continued)

OTHER PUBLICATIONS

Decision to Grant a Patent, issued on Jan. 7, 2014, granting a patent right to foreign application No. JP2012-057389, and an English Translation of the Decision.
(Continued)

*Primary Examiner* — Ario Etienne
*Assistant Examiner* — Sahera Halim
(74) *Attorney, Agent, or Firm* — Buchanan Ingersoll & Rooney PC

(57) ABSTRACT

An information processing system comprises a user terminal and an information processing device. A remote operation screen image for remotely operating the information processing device is displayed with the user terminal so that the information processing device is operated by remote control via the user terminal. The information processing device includes: a screen image controlling part for receiving
(Continued)

operation information from the user terminal; a contents determining part for determining if contents accessed by a browser are internal contents of the information processing device when the operation information is a process request requiring start up of the browser; and a browser controlling part for starting up a first browser on the information processing device when the internal contents are to be accessed, and sending a browser start up instruction to cause start up of a second browser installed on the user terminal when external contents are to be accessed.

29 Claims, 17 Drawing Sheets

(51) Int. Cl.
  *G06F 3/12* (2006.01)
  *H04N 1/00* (2006.01)
  *H04N 1/44* (2006.01)

(52) U.S. Cl.
  CPC ........... *G06F 3/1253* (2013.01); *G06F 3/1285* (2013.01); *H04N 1/00204* (2013.01); *H04N 1/00411* (2013.01); *H04N 1/00424* (2013.01); *H04N 1/00464* (2013.01); *H04N 1/00474* (2013.01); *H04N 1/00482* (2013.01); *H04N 1/00514* (2013.01); *H04N 1/4413* (2013.01); *H04N 1/4433* (2013.01); *H04N 1/00427* (2013.01); *H04N 2201/0039* (2013.01); *H04N 2201/0049* (2013.01); *H04N 2201/0055* (2013.01); *H04N 2201/0075* (2013.01); *H04N 2201/0094* (2013.01)

(58) Field of Classification Search
  USPC ......................................... 709/203, 217, 223
  See application file for complete search history.

(56) References Cited

U.S. PATENT DOCUMENTS

2005/0114766 A1   5/2005  Yamamoto
2010/0268828 A1*  10/2010 Pahlavan et al. ............. 709/227

FOREIGN PATENT DOCUMENTS

| JP | 2005-159449 A | 6/2005 |
| JP | 2007-013288 A | 1/2007 |
| JP | 2007-034576 A | 2/2007 |
| WO | 2008-038277 A2 | 4/2008 |
| WO | WO 2008038277 A2 * | 4/2008 |

OTHER PUBLICATIONS

Extended European Search Report issued Jan. 20, 2014, by the European Patent Office in corresponding European Patent Application No. 13157565.6. (11 pages).

Chinese First Office Action dated Feb. 25, 2015 issued in the corresponding Chinese Patent Application No. 201310075327.0 and English translation (31 pages).

Chinese Second Office Action dated Nov. 11, 2015 issued in the corresponding Chinese Patent Application No. 201310075327.0 and English translation (11 pages).

* cited by examiner

INFORMATION PROCESSING SYSTEM 1

INFORMATION PROCESSING SYSTEM FOR STARTING UP A BROWSER, USER TERMINAL, INFORMATION PROCESSING DEVICE, AND NON-TRANSITORY COMPUTER READABLE RECORDING MEDIUM

This application is based on the application No. 2012-057389 filed in Japan, the contents of which are hereby incorporated by reference.

BACKGROUND OF THE INVENTION

Field of the Invention

The present invention relates to an information processing system, a user terminal, an information processing device and a non-transitory computer readable recording medium. The present invention more specifically relates to a technique for remotely controlling the information processing device via the user terminal.

Description of the Background Art

Conventional information processing devices called as MFPs (Multi-Function Peripherals) including print and/or scan function are remotely operated over a network via the user terminals such as personal computers. This known technique is introduced for example in Japanese Patent Application Laid-Open No. JP 2007-13288 A. According to this known technique, a remote operation screen image is sent from the information processing device to the user terminal to remotely operate the information processing device via the user terminal. The remote operation screen image is caused to be displayed with the user terminal and operation information according to remote operation made by a user is sent to the information processing device. Thus, the user terminal is allowed to operate the information processing device by remote control.

The information processing devices in these days with multiple applications run the multiple applications in response to user's instruction, thereby performing a variety of process besides process corresponding to print and/or scan function. The applications include a browser that creates display screen image based on contents in languages such as HTML (HyperText Markup Language). Once the browser is run on the information processing device, the browser accesses a URL (Uniform Resource Locator) specified by the user and displays the contents by acquiring them of the URL. The user, therefore, is allowed to look for data such as materials to print with browsing web pages shared on the internet, for example, by starting the browser up on the information processing device.

This type of information processing device is also capable of running the browser in response to an instruction to start up the browser given by remote control via the user terminal. So, the display screen image the contents of which are acquired by the browser of the information processing device is displayed with the user terminal. If, however, the display screen image the contents of which are acquired by the browser of the information processing device is displayed with the user terminal, display of the screen image cannot be smoothly realized with the user terminal or execution of jobs such as a print job, which is instructed by another user, cannot be performed fast on the information processing device, resulting in significant performance reduction.

In order to avoid the performance reduction, in response to the browser start up instruction given by the user while the user terminal remotely operates the information processing device, the user terminal may run the browser installed therein and cause the browser to display the display screen image showing the acquired contents. The internal contents which restrict access from external browsers may be stored in the information processing device. If those internal contents are acquired by the browser of the user terminal, the security issue arises.

SUMMARY OF THE INVENTION

The present invention is intended to solve the above problems. Thus, the present invention is intended to provide an information processing system, a user terminal, an information processing device and a non-transitory computer readable recording medium capable of controlling performance reduction caused by running a browser while the information processing device is remotely operated via the user terminal and ensuring security of internal contents of the information processing device.

First, the present invention is directed to an information processing system comprising a user terminal and an information processing device that allow communication therebetween. A remote operation screen image for remotely operating the information processing device is displayed with the user terminal so that the information processing device is operated by remote control via the user terminal.

According to an aspect of the information processing system, the information processing device includes: a screen image controlling part for creating the remote operation screen image to be displayed with the user terminal and sending the created remote operation screen image to the user terminal, and receiving operation information based on operation made on the remote operation screen image from the user terminal; a contents determining part for determining whether or not contents accessed by a browser to be run are internal contents of the information processing device when the operation information received from the user terminal is a process request requiring start up of the browser; and a browser controlling part for starting up a first browser on the information processing device and causing the screen image controlling part to create the remote operation screen image based on a display screen image showing the internal contents displayed by the first browser when it is determined by the contents determining part that the internal contents are to be accessed, and sending a browser start up instruction to the user terminal to cause the user terminal to start up a second browser installed on the user terminal when it is determined by the contents determining part that external contents are to be accessed. The user terminal includes: a display part on which a variety of information is displayed; an operation screen image processing part for causing the remote operation screen image received from the information processing device to be displayed on the display part, and sending the operation information based on user's operation to the information processing device with the remote operation screen image being displayed on the display part; and a browser start up part for starting up the second browser on the user terminal and causing a display screen image showing the external contents acquired by the running second browser to be displayed on the display part in response to receiving the browser start up instruction from the information processing device after the operation information screen processing part sends the operation information.

Second, the present invention is directed to a user terminal capable of establishing communication with an information processing device. The user terminal displays a remote operation screen image for remotely operating the information processing device, thereby operating the information processing device by remote control.

According to one aspect of the user terminal, the user terminal, comprises: a display part on which a variety of information is displayed; an operation screen image processing part for causing the remote operation screen image received from the information processing device to be displayed on the display part, and sending operation information based on user's operation to the information processing device with the remote operation screen image being displayed on the display part; and a browser start up part for starting up a browser on the user terminal and causing a display screen image showing contents acquired by the browser to be displayed on the display part in response to receiving a browser start up instruction from the information processing device after the operation screen image processing part sends the operation information.

Third, the present invention is directed to an information processing device capable of establishing communication with a user terminal. The information processing device causes a remote operation screen image to be displayed with the user terminal and receives remote operation via the user terminal, thereby performing a variety of process.

According to one aspect of the information processing device, the information processing device, comprises: a screen image controlling part for creating the remote operation screen image to be displayed with the user terminal and sending the created remote operation screen image to the user terminal, and receiving operation information based on operation made on the remote operation screen image from the user terminal; a contents determining part for determining whether or not contents accessed by a browser to be run are internal contents of the information processing device when the operation information received from the user terminal is a process request requiring start up of the browser; and a browser controlling part for starting up a first browser on the information processing device and causing the screen image controlling part to create the remote operation screen image based on a display screen image showing the internal contents displayed by the first browser when it is determined by the contents determining part that the internal contents are to be accessed, and sending a browser start up instruction to the user terminal to cause the user terminal to start up a second browser installed on the user terminal when it is determined by the contents determining part that external contents are to be accessed.

Forth, the present invention is directed to a non-transitory computer readable recording medium on which a program is recorded. The program is executable on a user terminal capable of establishing communication with an information processing device. The program causes a remote operation screen image for remotely operating the information processing device to be displayed, thereby operating the information processing device by remote control.

According to an aspect of the non-transitory computer readable recording medium, the program executed on the user terminal to function as a system comprises: an operation screen image processing part for causing the remote operation screen image received from the information processing device to be displayed, and sending operation information based on user's operation to the information processing device with the remote operation screen image being displayed; and a browser start up part for starting up a browser on the user terminal and causing a display screen image showing contents acquired by the browser to be displayed in response to receiving a browser start up instruction from the information processing device after the operation screen image processing part sends the operation information.

Fifth, the present invention is directed to a non-transitory computer readable recording medium on which a program is recorded. The program is executable on an information processing device capable of establishing communication with a user terminal. The program causes a remote operation screen image to be displayed with the user terminal, thereby causing a variety of process to be performed in response to remote operation via the user terminal.

According to an aspect of the non-transitory computer readable recording medium, the program executed on the information processing device to function as a system comprises: a screen image controlling part for creating the remote operation screen image to be displayed with the user terminal and sending the created remote operation screen image to the user terminal, and receiving operation information based on operation made on the remote operation screen image from the user terminal; a contents determining part for determining whether or not contents accessed by a browser to be run are internal contents of the information processing device when the operation information received from the user terminal is a process request requiring start up of the browser; and a browser controlling part for starting up a first browser on the information processing device and causing the screen image controlling part to create the remote operation screen image based on a display screen image showing the internal contents displayed by the first browser when it is determined by the contents determining part that the internal contents are to be accessed, and sending a browser start up instruction to the user terminal to cause the user terminal to start up a second browser installed on the user terminal when it is determined by the contents determining part that external contents are to be accessed.

DESCRIPTION OF THE PRESENT PREFERRED EMBODIMENTS

Figure 1:
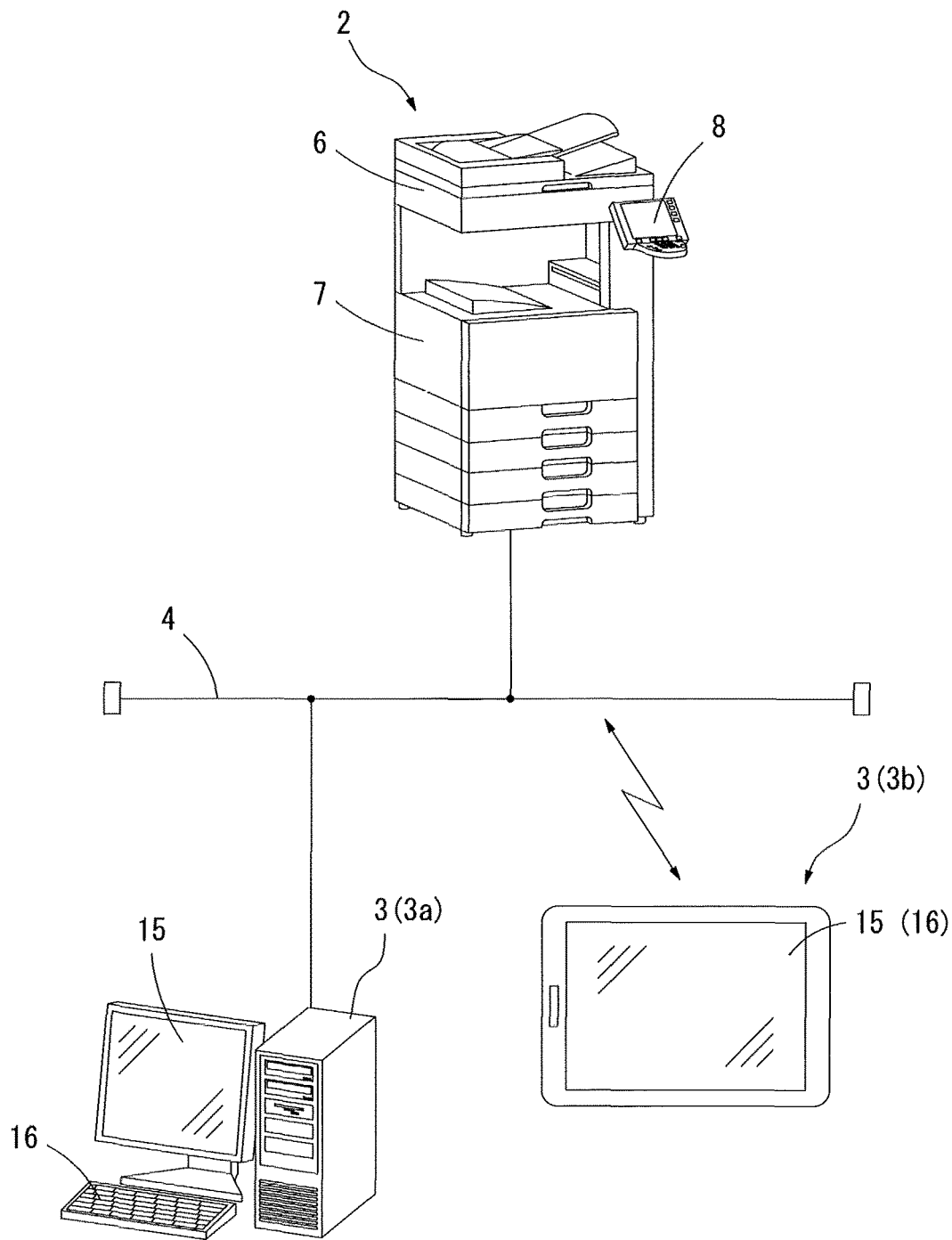
FIG. 1 shows an exemplary configuration of an information processing system.

A preferred embodiment of the present invention is described in detail below with reference to figures. In the description given below, those elements which are shared in common among figures are represented by the same reference numerals, and these elements are not discussed repeatedly for the same description.

FIG. 1 shows an exemplary configuration of an information processing system 1 of the present preferred embodiment. The information processing system 1 comprises an information processing device 2 formed from a device such as one of MFPs and a user terminal 3 used by a user. The information processing device 2 and the user terminal 3 are connected over a network 4 such as LAN (Local Area Network) to allow communication with each other. The network 4 is connected to a wide area network including internet. Each of the information processing device 2 and the user terminal 3 accesses an external server on the internet over the network 4 so that it may also acquire contents stored in the external server and display them. The external server may be connected directly to the network 4.

The information processing device 2 has multiple functions including copy, scan, print and box functions, for example, besides function to establish data communication over the network 4. Scan function is to drive an image reading section 6 provided at the upper part of the device body of the information processing device 2 to read image of a document and generate image data. Print function is to drive an image forming section 7 provided at the central part of the device body of the information processing device 2 to produce a printed output. Copy function is to activate scan and print function in cooperation with each other to copy the image of the document and produce the copied output. Box function is to store a variety of data in a storage region (BOX) described later. The image data read with scan function or data received over the network 4, for example, is stored in the storage region. These scan, print and box functions may operate in relative to data communication function to establish data communication over the network 4.

The information processing device 2 includes multiple application functions besides ones described above. So, multiple applications may be installed in advance on the information processing device 2. As one of the applications is selected by a user, the information processing device 2 starts the selected application up. According to the present preferred embodiment, a browser that acquires contents such as web pages in HTML, for instance, and creates display screen image is included in those multiple applications.

An operational panel 8, a user interface operable by the user in use of the information processing device 2 is provided at the front part of the device body of the information processing device 2. The information processing device 2 puts at least one of the above-mentioned multiple functions into operation to execute a job specified by the user in response to user's instruction given through the operational panel 8, for example.

As shown in FIG. 1, the user terminal 3 is formed from a device such as an information processing terminal 3a which is one of general personal computers (PC) or a communication terminal 3b such as a tablet terminal or a smart phone. The user terminal 3 is linked to the network 4 by wired or wireless connection to establish communication with the information processing device 2 or other devices over the network 4. In the present preferred embodiment, the user terminal 3 establishes communication with the information processing device 2 so that the user is allowed to remotely operate the information processing device 2 via the user terminal 3.

Figure 2:
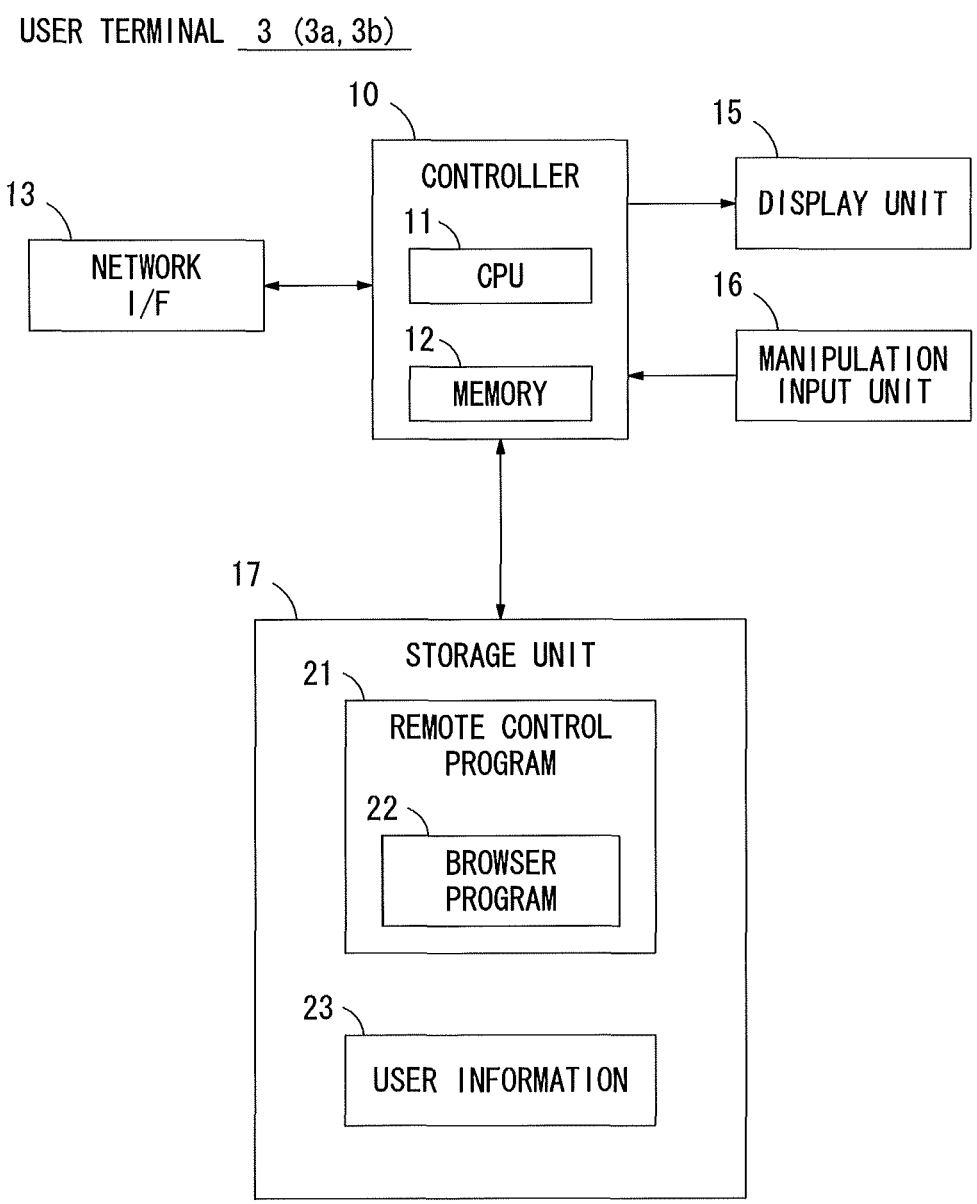
FIG. 2 is a block diagram showing an exemplary hardware configuration of a user terminal.

FIG. 2 is a block diagram showing an exemplary hardware configuration of the user terminal 3. As illustrated in FIG. 2, the user terminal 3 includes a controller 10, a network interface 13, a display unit 15, a manipulation input unit 16 and a storage unit 17. The controller 10 includes a CPU 11 and a memory 12. The storage unit 17 is formed from a storage device such as a hard disk drive (HDD) or a solid state drive (SSD).

The CPU 11 executes a various types of programs, and the controller 10 controls operations of each processing part. The memory 12 stores therein data such as temporary data required in accordance with execution of each program by the CPU 11. The network interface 13 is for connecting the user terminal 3 to the network 4 to establish wired or radio data communication. The display unit 15 on which various types of information is displayed to the user is formed from a device such as a color liquid crystal display, for example. The manipulation input unit 16 receives entries of a variety of instructions by the user. For the user terminal 3 which is the information processing terminal 3a, the manipulation input unit 16 is formed from a keyboard and/or a mouse, for example. For the user terminal 3 which is the communication terminal 3b, the manipulation input unit 16 is formed with parts such as touch panel sensors arranged on the screen of the display unit 15, for example. The storage unit 17 formed from a nonvolatile storage device stores therein a program or a variety of information installed in advance on the user terminal 3.

A remote control program 21 is installed in advance on the storage unit 17 of the user terminal 3 of the present preferred embodiment. In response to a remote control program 21 start up instruction by the user, the CPU 11 of the controller 10 reads and executes the remote control program 21. Thus, a function to operate the information processing device 2 by remote control is activated on the user terminal 3 and communication between the user terminal 3 and the information processing device 2 is started. As a result, the user is allowed to remotely operate the information processing device 2 using the user terminal 3.

The remote control program 21 includes a browser program 22 as shown in FIG. 2. The browser program 22 is specially for remote operation which is automatically run as required while the information processing device 2 is remotely operated by the user.

A general browser program which is run in response to the user's instruction may be separately installed on the storage unit 17 besides the browser program 22 included in the remote control program 21.

User information 23 regarding the user is stored in the storage unit 17. The user information 23 is information required to use the information processing device 2. The user terminal 3 sends the user information 23 to the information processing device 2 when starting remote control of the information processing device 2. The user information 23 is sent to the information processing device 2 so that the information processing device 2 is capable of authenticating the user who makes remote operation is a registered user or not.

Figure 3:
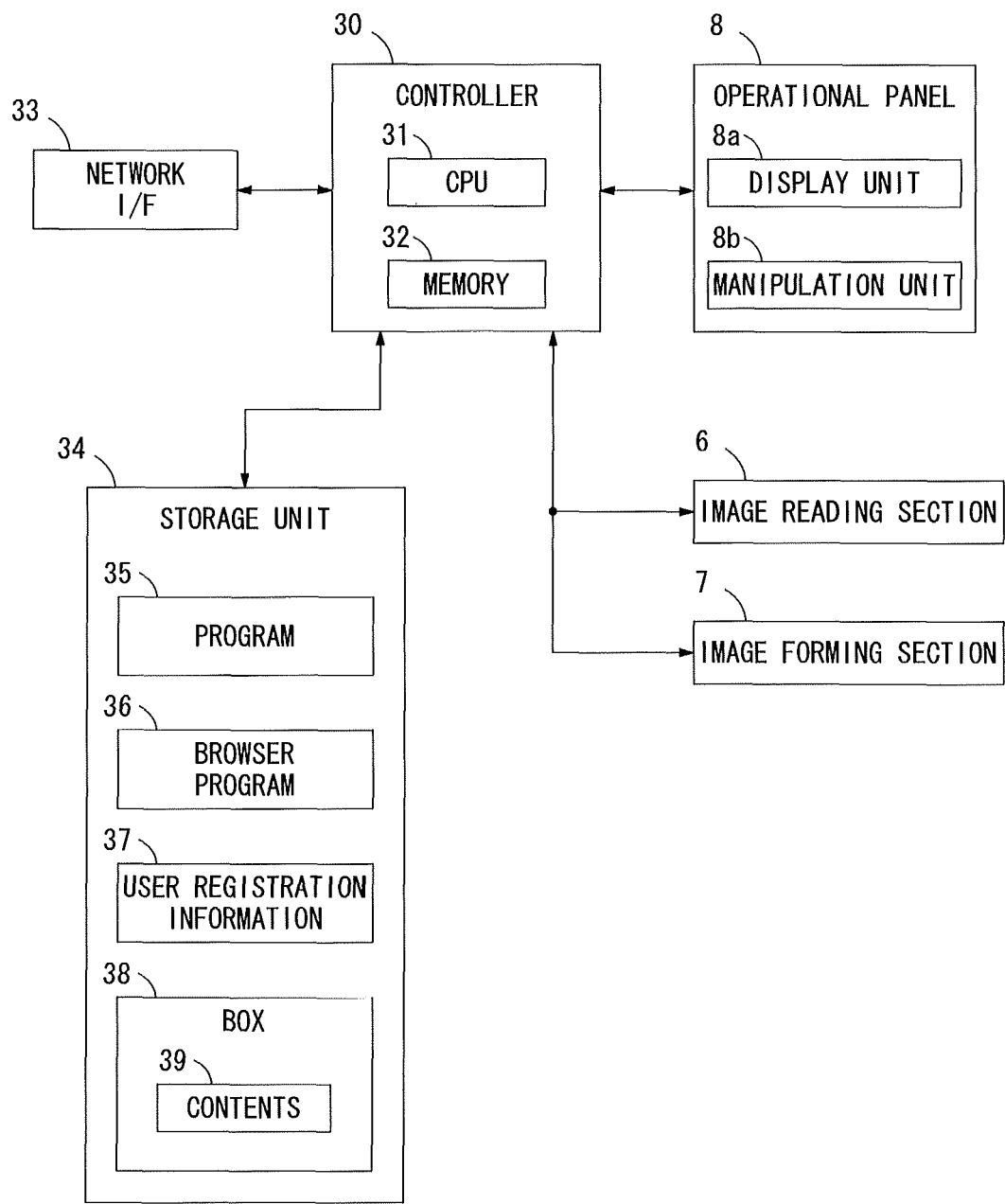
FIG. 3 is a block diagram showing an exemplary hardware configuration of an information processing device.

FIG. 3 is a block diagram showing an exemplary hardware configuration of the information processing device 2. As described above, the information processing device 2 includes the image reading section 6, the image forming section 7 and the operational panel 8. The operational panel 8 includes a display unit 8a on which various types of information is displayed to the user and a manipulation unit 8b which receives a variety of entries by the user.

The information processing device 2, as illustrated in FIG. 3, includes a controller 30, a network interface 33 and a storage unit 34. The controller 30 includes a CPU 31 and a memory 32. In response to execution of various types of programs stored in the storage unit 34 by the CPU 31, the controller 30 controls operations of each processing part. The memory 32 stores therein data such as temporary data required in accordance with execution of each program by the CPU 31. The network interface 33 is for connecting the information processing device 2 to the network 4 to establish network communication. The storage unit 34 is a nonvolatile storage device formed from a device such as a hard disk drive (HDD) or a solid state drive (SSD). The storage unit 34 stores therein in advance a program 35, a browser program 36 and user registration information 37.

The program 35 is a basic program on the information processing device 2. As the information processing device 2 is powered on, for example, the program 35 is automatically read and executed by the CPU 31 of the controller 30. The browser program 36 is required for displaying the contents such as the web page in a manner they can be browsed. Information regarding an individual user authorized to use the information processing device 2 is registered as the user registration information 37.

The storage unit 34 includes a BOX 38 as a storage region to store therein a variety of contents 39. The contents 39 contains, for instance, a web page in a language such as HTML and information such as attribution information including an image, an icon and document data constructing the web page. The contents 39 are not necessarily stored in the BOX 38, and it may be stored in a storage region other than the BOX 38.

Figure 4:
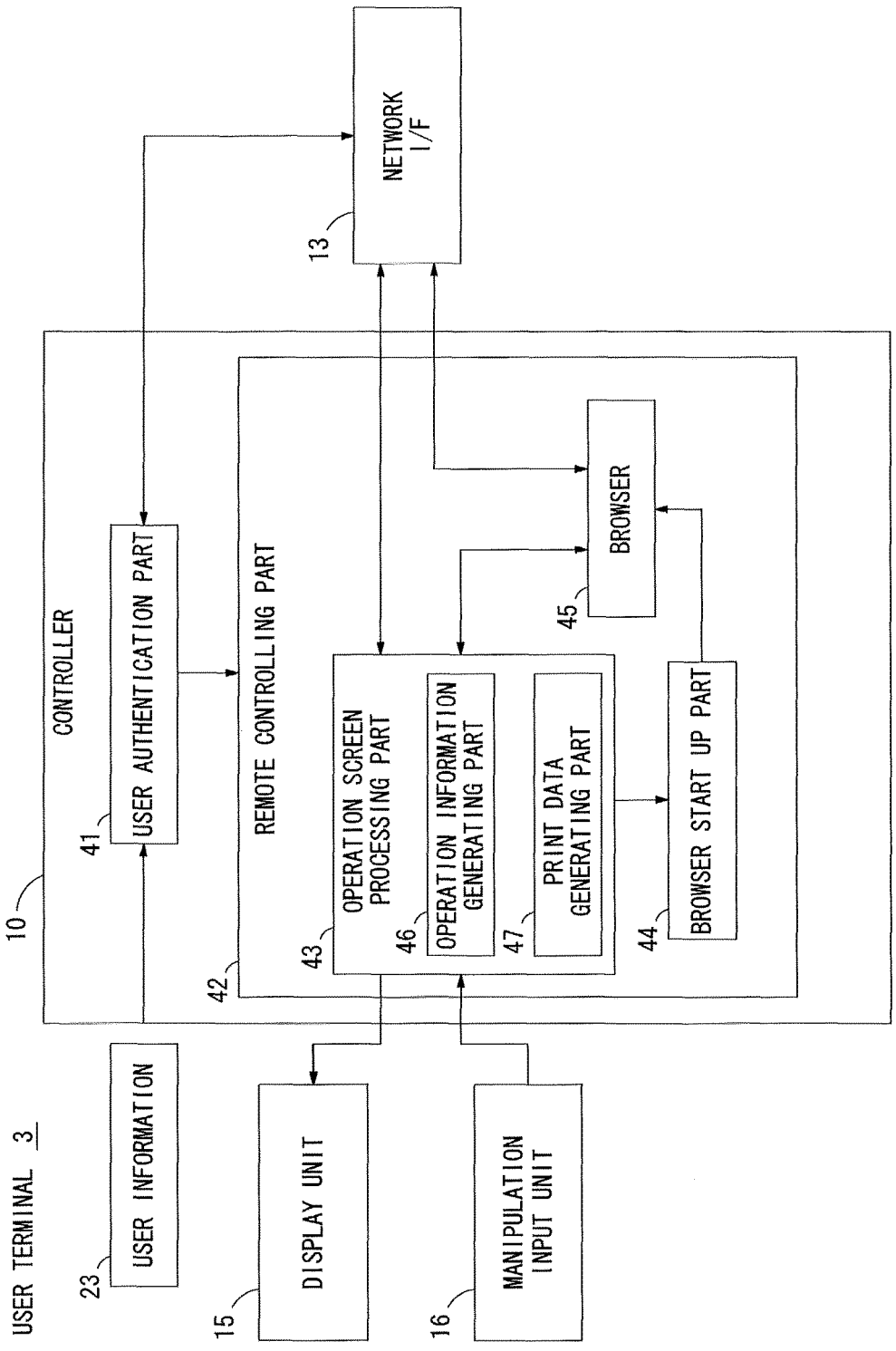
FIG. 4 is a block diagram showing an exemplary functional configuration on the user terminal.
Figure 5:
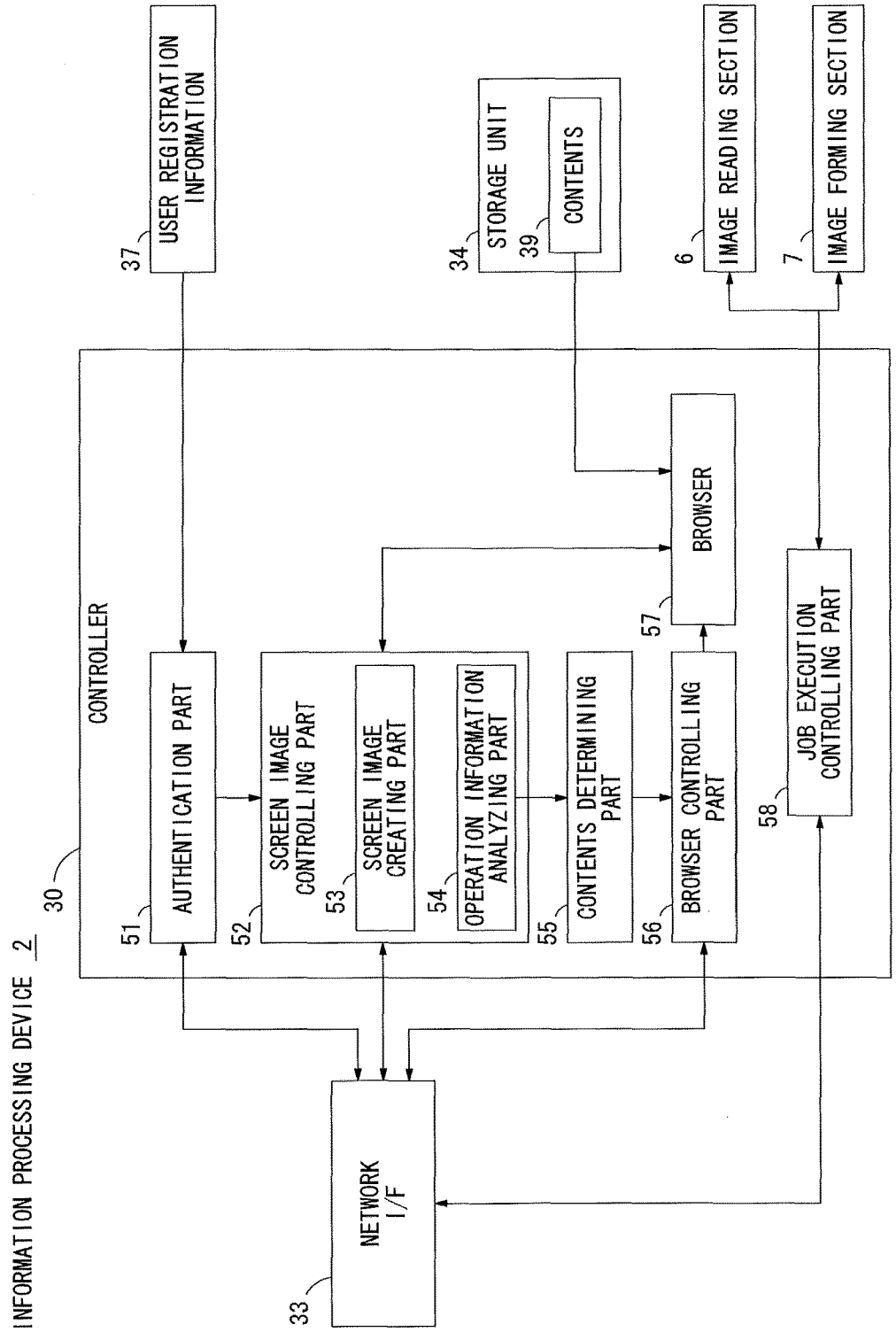
FIG. 5 is a block diagram showing an exemplary functional configuration on the information processing device.

Next, a function when the information processing device 2 is operated by remote control via the user terminal 3 on the information processing system 1 is described. FIG. 4 is a block diagram showing an exemplary functional configuration on the user terminal 3. FIG. 5 is a block diagram showing an exemplary functional configuration on the information processing device 2.

As shown in FIG. 4, the user terminal 3 serves as a user authentication part 41 and a remote controlling part 42 as the remote control program 21 is run on the controller 10.

The user authentication part 41 reads the user information 23 in the storage unit 17 and requests for authentication for the information processing device 2 after the remote control program 21 is started up on the controller 10. More specifically, the user authentication part 41 sends the user information 23 to the information processing device 2 via the network interface 13 and acquires a result of authentication performed on the information processing device 2. If the user is authenticated as the registered user as the result of the authentication on the information processing device 2, the remote controlling part 42 is put into operation to function.

The remote controlling part 42 operates the information processing device 2 by remote control over the network 4. The remote controlling part 42, as shown in FIG. 4, serves as an operation screen processing part 43, a browser start up part 44 and a browser 45. The operation screen processing part 43 causes the remote operation screen image for remote operation of the information processing device 2 to be displayed on the display unit 15. The operation screen processing part 43 acquires at least a part of the remote operation screen image from the information processing device 2 and displays it. The operation screen processing part 43 includes an operation information generating part 46 which generates operation information corresponding to user's operation in response to detection of the operation with the remote operation screen image being displayed on the display unit 15. The operation screen processing part 43 then sends the operation information generated by the operation information generating part 46 to the information processing device 2.

In response to receipt of the operation screen image from the information processing device 2 after sending the operation information to the information processing device 2, the operation screen processing part 43 causes the received operation screen image to be displayed on the display unit 15. As receiving the browser start up instruction from the information processing device 2, the operation screen processing part 43 brings the browser start up part 44 into operation.

The browser start up part 44 starts up the browser program 22 in response to the instruction from the information processing device 2. The controller 10 then serves as the browser 45. The browser 45 is a browser specially for remote operation which serves as a part of the remote controlling part 42. The browser 45 acquires the contents such as a web page via the network interface 13 and creates the display screen image showing the acquired contents laid out. The display screen image created by the browser 45 is output to the operation screen processing part 43. The operation screen processing part 43 causes the display screen image created by the browser 45 to be displayed on the display unit 15 as a part of the remote operation screen image while the browser 45 is running.

The operation screen processing part 43 includes a print data generating part 47. The print data generating part 47 is brought into operation in response to detection of user's print instruction with the browser 45 being in operation on the remote controlling part 42. The print data generating part 47 generates data for use in print output based on the display screen image created by the browser 45. The operation screen processing part 43 sends the operation information as to the instruction on print output to the information processing device 2 together with the data for use in print output generated by the print data generating part 47.

As shown in FIG. 5, the information processing device 2 serves as an authentication part 51, a screen image controlling part 52, a contents determining part 55, a browser controlling part 56, a browser 57 and a job execution controlling part 58. The program 35 is run on the controller 30 so that the authentication part 51, the screen image controlling part 52, the contents determining part 55, the browser controlling part 56 and the job execution controlling part 58 are brought into operation. The browser 57 is brought into operation as the browser program 36 is run on the controller 30.

In response to receipt of the user information 23 from the user terminal 3, the authentication part 51 determines whether or not any information registered as the user registration information 37 matches the user information 23, thereby authenticating if the user of the user terminal 3 is registered or not. If the user is identified as the registered user as the result of the authentication by the authentication part 51, the screen image controlling part 52 is put into operation to function on the controller 30.

The screen image controlling part 52 performs process regarding the operation screen image for remote operation displayed with the user terminal 3. To be more specific, the screen image controlling part 52 sends the operation screen image for remote operation to the user terminal 3 and receives the operation information based on the operation made on the operation screen image from the user terminal 3, thereby controlling the operation screen image displayed with the user terminal 3.

The screen image controlling part 52 includes a screen image creating part 53 and an operation information analyzing part 54. The screen image creating part 53 creates the operation screen image for remote operation via the user terminal 3 and updates the operation screen image. In response to receipt of the operation information from the user terminal 3, the operation information analyzing part 54 analyzes the received operation information to designate the process specified by the user who operates the user terminal 3. If the process specified by the user requires update of the operation screen image as a result of the analysis, the screen image creating part 53 updates the operation screen image according to the operation information. The screen image controlling part 52 sends the operation screen image to the user terminal 3 every time the operation screen image is updated by the screen image creating part 53. The operation screen image displayed with the user terminal 3, therefore, is always updated to the one incorporating the changes made by user's operation.

If the process request requiring the start up of the browser 57 is specified by the user's operation as the result of analyzing the operation information, the operation information analyzing part 54 puts the contents determining part 55 into operation to function. The operation information may be the process request requiring the start up of the browser 57. In such a case, the contents determining part 55 determines whether or not the contents accessed by the browser 57 to be started up are the internal contents 39 stored inside the information processing device 2. The process request requiring the start up of the browser 57, for example, contains an address such as URL (Uniform Resource Locator) accessed by running the browser 57. The contents determining part 55 determines whether or not the address is the internal address of the information processing device 2, thereby determining if the contents acquired by the browser 57 by accessing the address are the internal contents 39. The contents determining part 55 then notifies the browser controlling part 56 of the determination result.

The browser controlling part 56 is brought into operation when the process request requiring the start up of the browser 57 is detected. The browser controlling part 56 runs the browser on either of the information processing device 2 or the user terminal 3 based on the determination result by the contents determining part 55.

When it is specified by the contents determining part 55 that the destination of access by the browser 57 is the internal contents 39, the browser controlling part 56 starts the browser 57 up on the information processing device 2. To be more specific, the browser controlling part 56 reads the browser program 36 in the storage unit 34 and executes the read browser program 36 on the CPU 31, thereby bringing the browser 57 into operation. As the browser 57 is brought into operation on the controller 30, the browser 57 acquires the contents 39 in the storage unit 34 and creates the display screen image based on the contents 39. The browser 57 then outputs the created display screen image to the screen image controlling part 52. Once the browser 57 is brought into operation, the screen image controlling part 52 processes the display screen image to be displayed with the user terminal 3 based on the display screen image output from the browser 57 and sends the processed display screen image to the user terminal 3.

When it is specified by the contents determining part 55 that the destination of access by the browser 57 is the external contents stored outside the information processing device 2, the browser controlling part 56 does not start the browser 57 up on the information processing device 2 and sends the browser start up instruction to the user terminal 3. In this case, the browser 45 is started up on the user terminal 3 and the external contents are acquired by the user terminal 3 and displayed with itself.

There may be two types of internal contents 39 stored in the information processing device 2. One is the private internal contents which are the access restricted internal contents and are not acquired directly by outside via the access from outside, and another is open internal contents which are openly available and access to which is not restricted. With these two types of internal contents 39, the contents determining part 55 not only determines if the destination of access by the browser 57 to be started up is the internal contents 39 but also determines whether or not the internal contents 39 accessed by the browser 57 are the private or open contents when the destination of access is the internal contents 39. When the private internal contents 39 are to be accessed by the browser 57, the browser controlling part 56 starts the browser 57 of the information processing device 2 up. When the open internal contents 39 which are openly available are to be accessed by the browser 57, the browser controlling part 56 does not start the browser 57 of the information processing device 2 up and sends the browser start up instruction to the user terminal 3. In this case, the browser 45 is started up on the user terminal 3. In response to the start up of the browser 45, the browser 45 of the user terminal 3 acquires the open internal contents 39 of the information processing device 2 and display process based on the acquired internal contents 39 is performed on the use terminal 3.

When the job execution instruction by the user is received as the result of analysis of the operation information by the screen image controlling part 52, the job execution controlling part 58 is brought into operation on the controller 30. The job execution controlling part 58 controls execution of a job by driving each of the image reading section 6 and the image forming section 7 in response to the job execution instruction received from the user terminal 3.

In response to receipt of the instruction on print output from the user terminal 3, for example, the job execution controlling part 58 configures the print settings with the image forming section 7 based on the operation screen image displayed with the user terminal 3 at the receipt of the instruction and drives the image forming section 7, thereby producing the printed output. If the browser 57 has been running on the controller 30, the job execution controlling part 58 acquires the data for use in print output for printing from the browser 57 and drives the image forming section 7 in accordance with the data for use in print output. If the browser 45 is running on the user terminal 3 in response to the browser start up instruction from the browser controlling part 56, the job execution controlling part 58 acquires the data for use in print output which is received from the user terminal 3 and drives the image forming section 7 in accordance with the data for use in print output.

Figure 6:
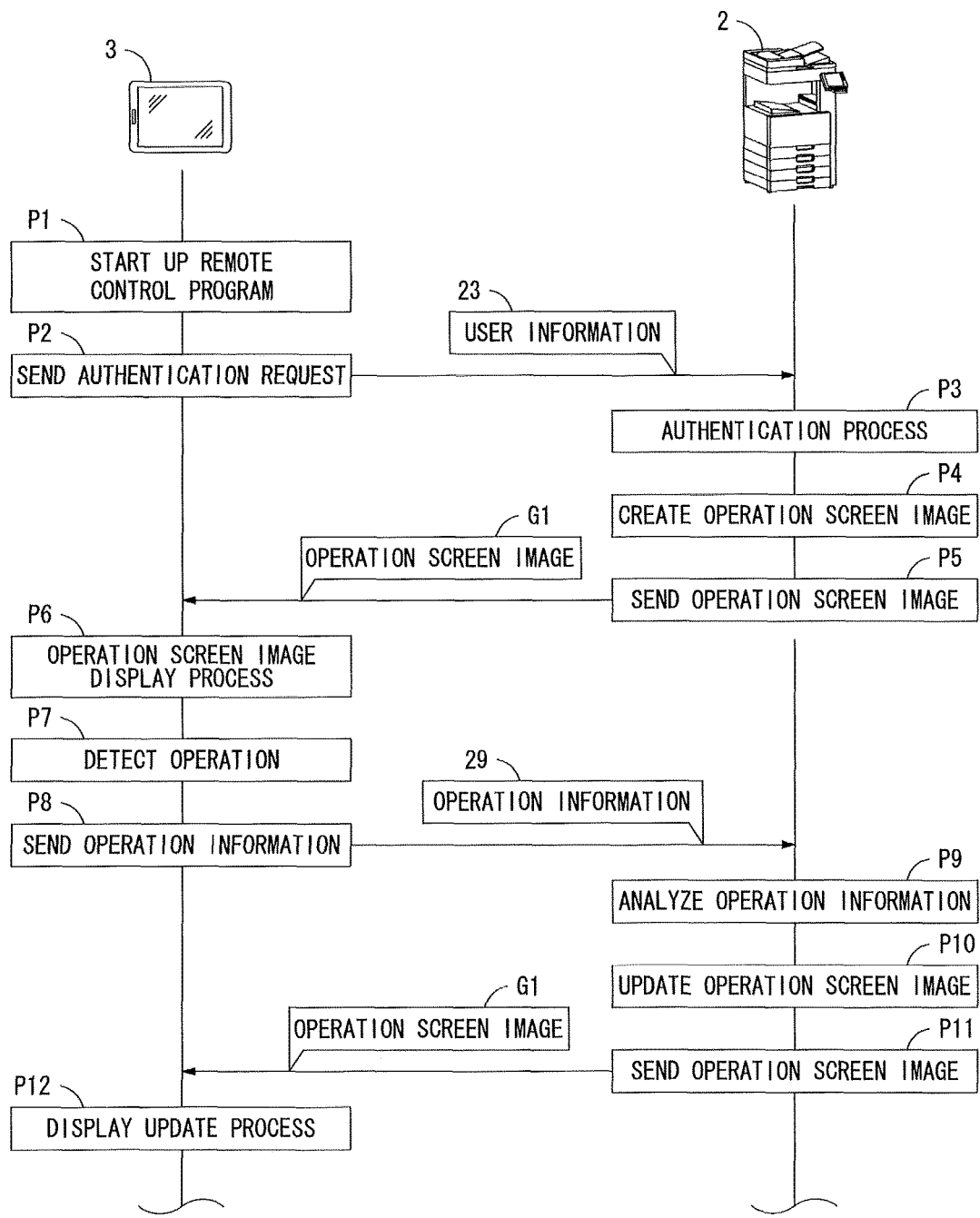
FIG. 6 is a flow diagram explaining an exemplary sequential procedure to operate the information processing device by remote control via the user terminal.

The sequential procedure of the process performed on the information processing system 1 as described above is explained next. FIG. 6 is a flow diagram explaining an exemplary sequential procedure to operate the information processing device 2 by remote control via the user terminal 3. Upon start of the process, the user terminal 3 starts the remote control program 21 up in response to the user's instruction (process P1). With the start up of the remote control program 21, the user authentication part 41 is brought into operation on the user terminal 3 and sends the authentication request to the information processing device 2 (process P2). When sending the authentication request, the user information 23 is sent to the information processing device 2 from the user terminal 3.

As receiving the user information 23 from the user terminal 3, the information processing device 2 performs the authentication process (process P3). When the user of the user terminal 3 is identified as the registered user as the result of the authentication, the information processing device 2 puts the screen image controlling part 52 into operation to function to create operation screen image G1 for remote operation via the user terminal 3 (process P4). The operation screen image G1 thereby created contains screen image information and attribution information attached to the screen image information, for example. The screen image information is image information such as a bit map image of one screen image created at resolution of a predetermined level to be displayed on the display unit 15 of the user terminal 3. The attribution information is information indicating location of each operation button and type of each operation button contained in the screen image information of one screen image. The information processing device 2 sends the operation screen image G1 to the user terminal 3 (process P5). In sending the operation screen image G1, the information processing device 2 also sends the information as to the applications that may be started up on the information processing device 2 to the user terminal 3 with the operation screen image G1. The information as to the applications is not required to be sent to the user terminal 3 from the information processing device 2 several times if it is sent once at first.

When the authentication performed on the information processing device 2 results in success, the user terminal 3 puts the remote controlling part 42 into operation to function to perform display process of operation screen image for remote operation based on the operation screen image G1 received from the information processing device 2 (process P6).

Figure 7:
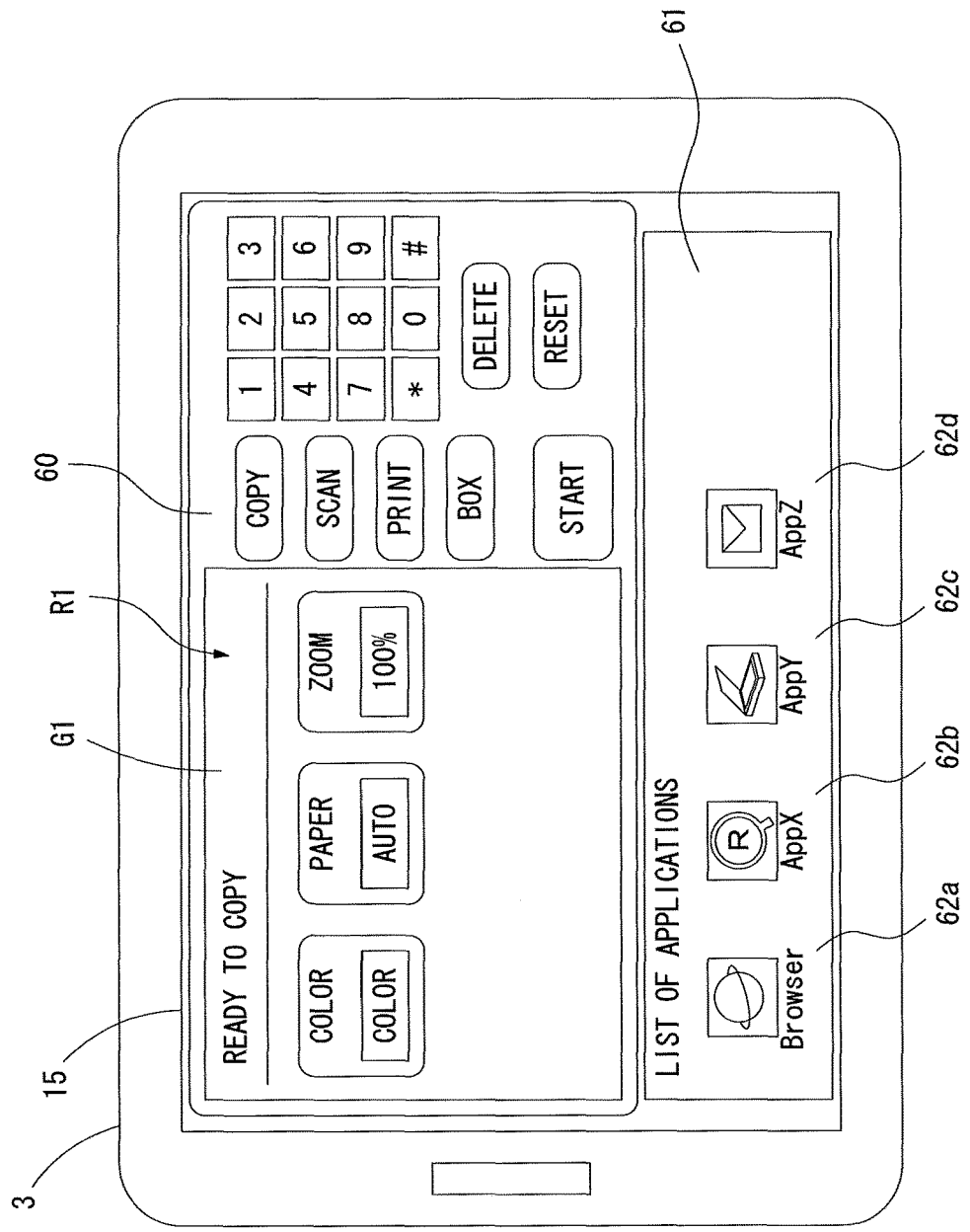
FIG. 7 is an example of a remote operation screen image displayed with the user terminal.

FIG. 7 is an example of a remote operation screen image displayed with the user terminal 3. The remote operation screen image displayed on the display unit 15 of the user terminal 3 includes a remote panel 60 and a list of applications 61. The remote panel 60 imitates the operational panel 8 of the information processing device 2, and the list of applications 61 shows a list of applications installed on the information processing device 2. So, once the remote controlling part 42 is put into operation to function on the user terminal 3, the remote panel 60 and the list of applications 61 are displayed on the display unit 15.

As illustrated in FIG. 7, the remote panel 60 includes a display region R1 to display the operation screen image G1 for remote operation received from the information processing device 2. The display region R1 imitates the display unit 8a of the operational panel 8 of the information processing device 2. The display region R1 has a resolution that corresponds to the screen image information of the operation screen image G1 received from the information processing device 2, for instance. The remote controlling part 42 displays the remote panel 60 on the display unit 15 and the operation screen image G1 received from the information processing device 2 in the display region R1 of the remote panel 60.

The remote controlling part 42 shows icon images 62a, 62b, 62c and 62d of the applications that may be started up on the information processing device 2 in the list of applications 61 in accordance with the information as to the applications received from the information processing device 2. The icon image 62a of the icon images 62a, 62b, 62c and 62d is pressed to start the browser 57 up on the information processing device 2.

The user is allowed to operate the information processing device 2 even from a distance with the remote operation screen image displayed with the user terminal 3.

Referring back to FIG. 6, the user terminal 3 detects user's operation after the operation screen image display process in process P6 (process P7). In response to detecting user's operation, the user terminal 3 generates the operation information 29 corresponds to the operation and sends the generated information to the information processing device 2 (process P8).

In response to receipt of the operation information 29 from the user terminal 3, the information processing device 2 analyzes the operation information 29 (process P9) and updates the operation screen image G1 based on the operation information 29 (process P10). When, for example, the operation information 29 is about settings such as the paper settings or zoom settings regarding copy function, the information processing device 2 newly creates the operation screen image G1 incorporating the settings change specified by the user based on the operation information 29 and updates the operation screen image G1 previously displayed. The information processing device 2 sends the updated operation screen image G1 to the user terminal 3 (process P11). After acquiring the operation screen image G1 updated based on the operation information 29 from the information processing device 2, the user terminal 3 performs display update process with the acquired operation screen image G1 (process P12). The user terminal 3 updates the display of the display region R1 by switching the operation screen image G1 displayed in the display region R1 as shown in FIG. 7 to the operation screen image G1 newly received from the information processing device 2.

As the user makes the operation to the remote operation screen image displayed on the display unit 15 of the user terminal 3, the operation screen image G1 incorporating the user's operation is displayed. The user is allowed to operate the information processing device 2 by remote control using the user terminal 3.

One of the applications in the list of applications 61 may be selected by the user with the remote operation screen image as shown in FIG. 7 being displayed. In this case, the operation information 29 including the start up instruction of the selected application is sent to the information processing device 2 from the user terminal 3. After receiving the operation information 29 including the application start up instruction, the information processing device 2 performs the process to start up the application selected by the user.

Figure 8:
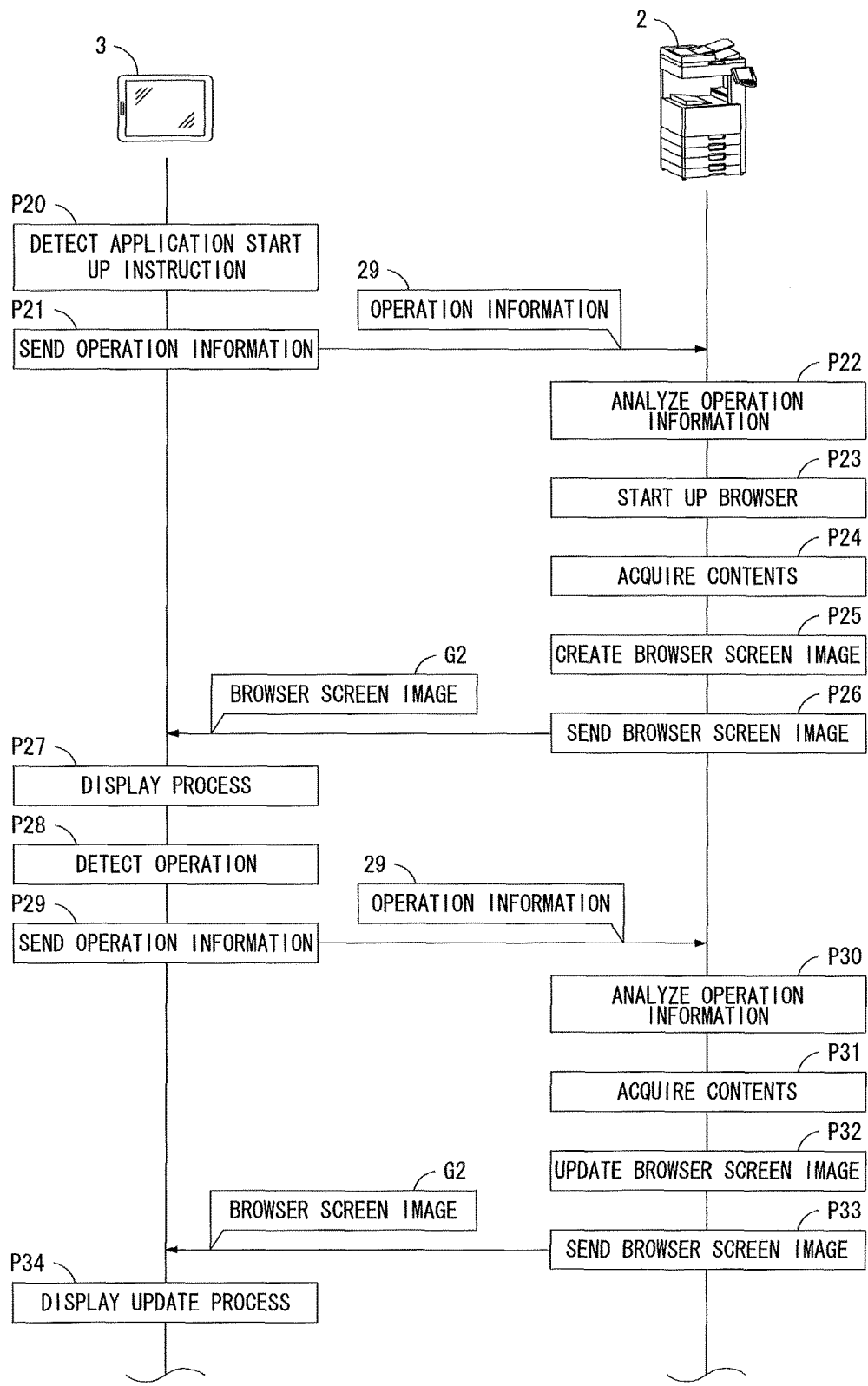
FIG. 8 is a flow diagram explaining an exemplary sequential procedure when contents acquired by a browser are internal contents of the information processing device.

The sequential procedure of the process performed when the user makes the operation to start the browser 57 up is explained next. FIG. 8 is a flow diagram explaining an exemplary sequential procedure when the contents acquired by the browser 57 are the internal contents of the information processing device 2. After detecting the application start up instruction by the user (process P20), the user terminal 3 generates the operation information 29 based on the application start up instruction and sends the generated operation information 29 to the information processing device 2 (process P21).

As receiving the operation information 29 including the application start up instruction from the user terminal 3, the information processing device 2 analyzes the received operation information 29 (process P22). The information processing device 2 determines if the application specified by the user requires start up of the browser 57. When the application specified by the user requires start up of the browser 57, the information processing device 2 further determines whether or not the contents acquired by the browser 57 with access to it are the internal contents 39 based on the address such as URL included in the operation information 29. In the present preferred embodiment, when the contents acquired by the browser 57 with access are the internal contents 39, it is determined whether the internal contents 39 are the private internal contents which are the access restricted internal contents and are not acquired directly by outside via the access from outside or the open internal contents which are openly available and access from outside to which is not restricted.

If the contents acquired by the browser 57 by accessing them are the internal contents 39 and the internal contents 39 to be acquired are the private internal contents, the information processing device 2 executes the browser program 36 to start the browser 57 up on the controller 30 (process P23). The browser 57 running on the information processing device 2 acquires the internal contents 39 (process P24) and creates the browser screen image showing the acquired internal contents 39 laid out (process P25). The information processing device 2 puts the screen image controlling part 52 into operation to send the browser screen image G2 created by the browser 57 to the user terminal 3 (process P26). The information processing device 2 does not send the browser screen image created by the browser 57 as it is to the user terminal 3. The browser screen image G2 which is a bit map image at a resolution corresponding to the display region R1 of the remote operation screen image converted from the browser screen image, for example, is sent. More specifically, the browser screen image G2 sent to the user terminal 3 from the information processing device 2 contains the screen image information which is information such as a hit map image processed from the browser screen image created by the browser 57 and the attribution information attached to the screen image information, which is the same as the operation screen image G1 described above.

After receiving the browser screen image G2 from the information processing device 2, the user terminal 3 displays the browser screen image G2 in the display region R1 of the remote operation screen image (process P27).

Figure 9:
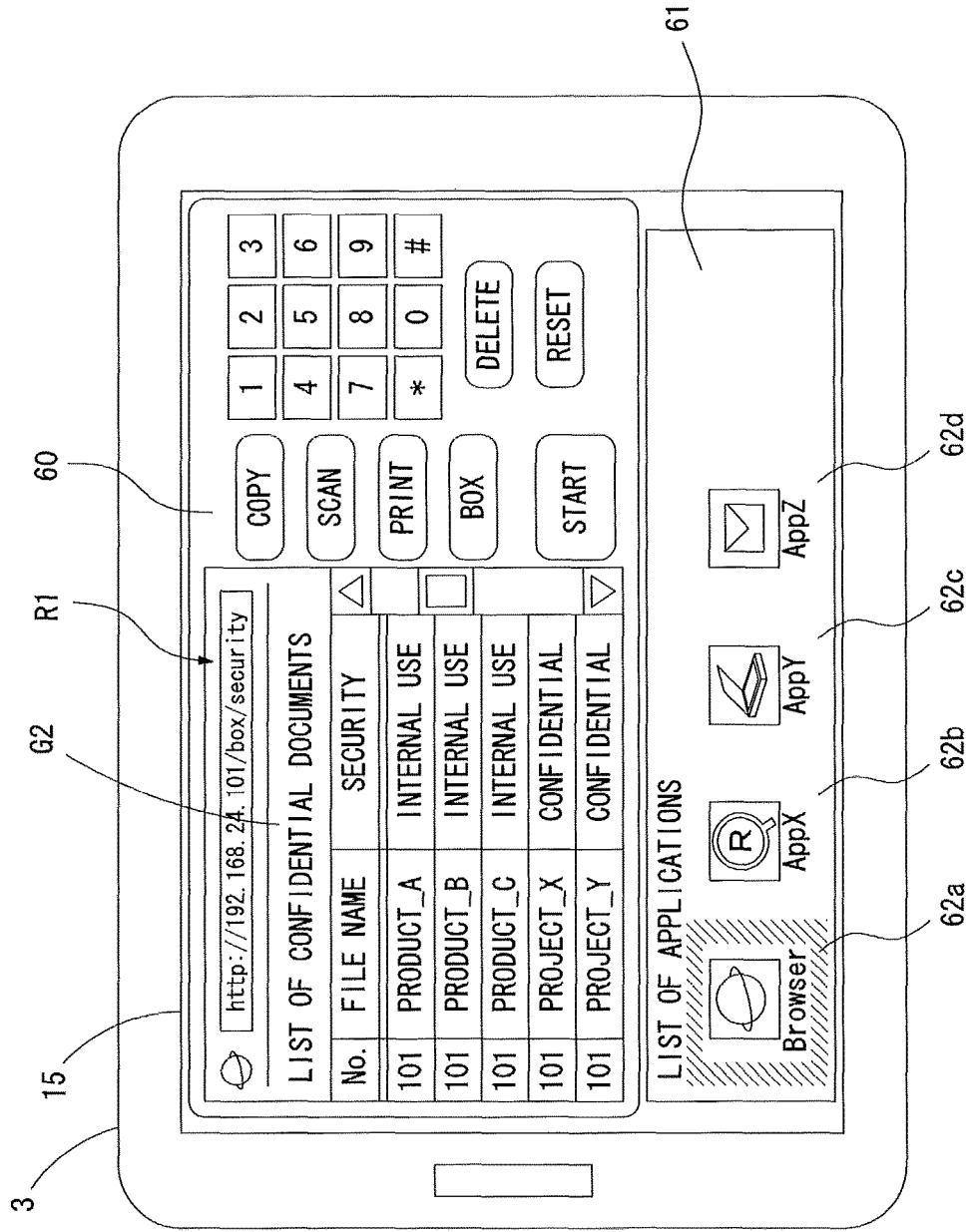
FIG. 9 is an example of the remote operation screen image displayed with the user terminal with a first browser running on the information processing device.

FIG. 9 is an example of the remote operation screen image displayed with the user terminal 3 with the browser 57 running on the information processing device 2. As illustrated in FIG. 9, the user terminal 3 displays the browser screen image G2 in the display region R1. The user is allowed to see the data such as documents stored on the information processing device 2 by checking the browser screen image G2 displayed with the user terminal 3. The browser screen image G2 displayed in the display region R1 is an image, for instance, converted to a bit map image corresponding to the resolution of the display region R1. The browser screen image G2 displayed with the user terminal 3 may contain confidential documents. Even in such a case, text data contained in the confidential documents may be prevented from being leaked out as it is to outside of the information processing device 2. Also, the internal contents 39 cannot be used in its original data form on the user terminal 3. The license of the internal contents 39, therefore, may be normally managed.

Referring back to FIG. 8, after the display process of the browser screen image G2 in the process P27, the user terminal 3 detects user's operation (process P28). In response to detecting user's operation, the user terminal 3 generates the operation information 29 corresponds to the operation and sends the generated information to the information processing device 2 (process P29).

In response to receipt of the operation information 29 from the user terminal 3, the information processing device 2 again analyzes the received operation information 29 (process P30). When the user's operation is the operation made through the browser screen image G2, the browser 57 running on the information processing device 2 acquires the internal contents 37 in response to the operation (process P31) and updates the browser screen image (process P32). The information processing device 2 converts the browser screen image updated by the browser 57 to data such as a bit map image and sends to the user terminal 3 (process P33). The user terminal 3 then updates the browser screen image displayed in the display region R1 based on the browser screen image G2 received from the information processing device 2 (process P34).

As the browser screen image G2 displayed with the user terminal 3 is operated by the user, the browser screen image G2 is updated in response to the operation. Thus, the user is allowed to operate the information processing device 2 by remote control by operating the browser screen image G2 displayed with the user terminal 3. The browser screen image G2 may be a screen image for configuring settings of copy or scan function, for example. In this case, the user is allowed to configure the settings relating to copy or scan function on the information processing device 2 by operating the browser screen image G2.

Figure 10:
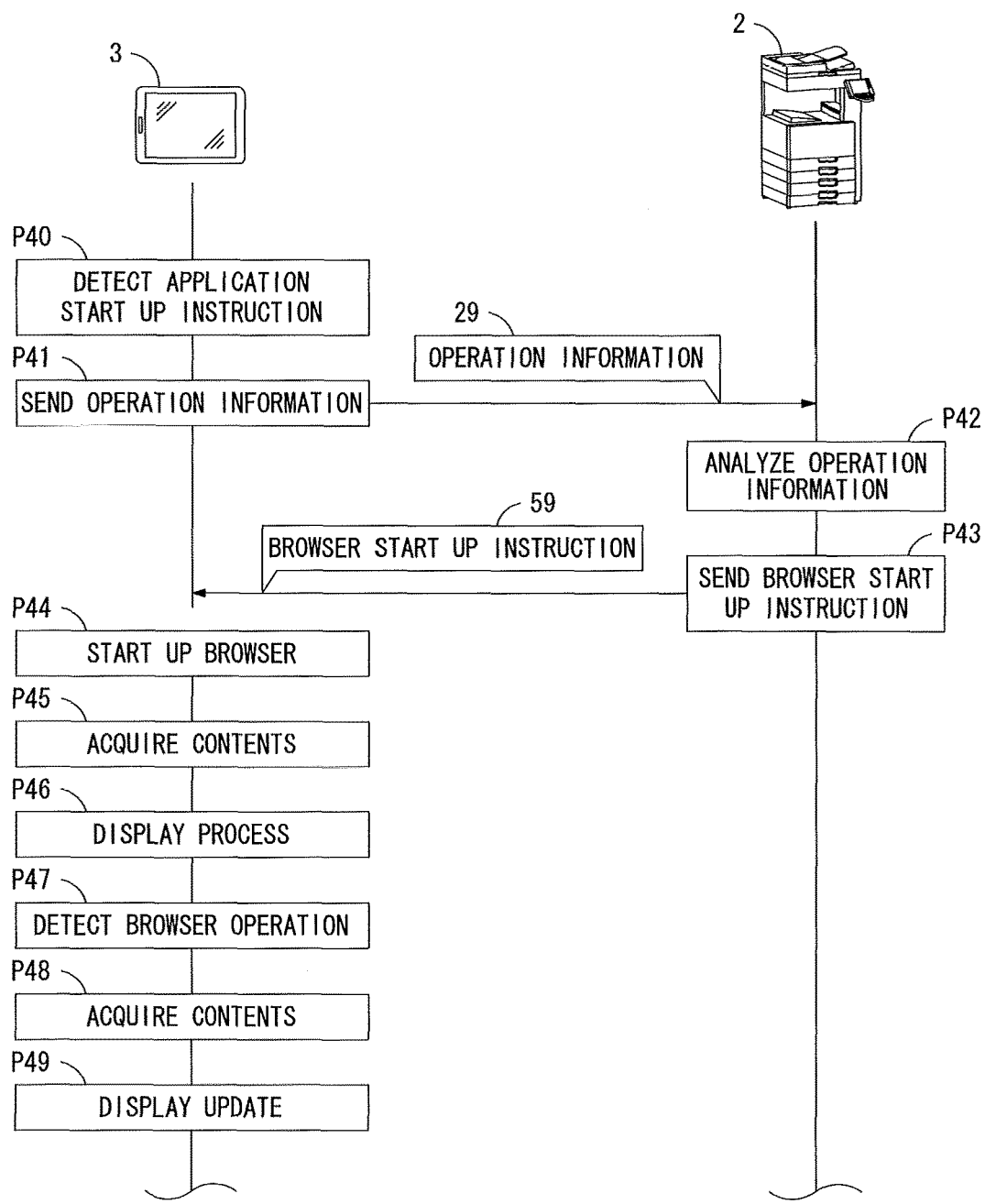
FIG. 10 is a flow diagram explaining an exemplary sequential procedure when the contents acquired by the browser are external contents of the information processing device.

FIG. 10 is a flow diagram explaining an exemplary sequential procedure when the contents acquired by the browser 57 are the external contents of the information processing device 2. The contents acquired by the browser 57 may be the internal contents of the information processing device 2. Even in such a case, if the acquired internal contents are the open internal contents which are openly available and access to which is not restricted, the sequential procedure of FIG. 10 is performed.

After detecting the application start up instruction by the user (process P40), the user terminal 3 generates the operation information 29 based on the application start up instruction and sends the generated operation information 29 to the information processing device 2 (process P41).

As receiving the operation information 29 including the application start up instruction from the user terminal 3, the information processing device 2 analyzes the received operation information 29 (process P42). The information processing device 2 determines if the application specified by the user requires start up of the browser 57. When the application specified by the user requires start up of the browser 57, the information processing device 2 further determines whether or not the contents acquired by the browser 57 by accessing the address such as URL included in the operation information 29 are the internal contents 39. In the present preferred embodiment, when the contents to be acquired by the browser 57 with access are the internal contents 39, it is determined whether the internal contents 39 are the private internal contents which are the access restricted internal contents and are not acquired directly by outside via the access from outside or the open internal contents which are openly available and access from outside to which is not restricted. If the contents to be acquired by the browser 57 with access are the external contents or the open internal contents, the information processing device 2 does not execute the browser program 36 by itself and sends a browser start up instruction 59 to the user terminal 3 (process P43). The browser start up instruction 59 thereby sent contains an address such as URL.

In response to receipt of the browser start up instruction 59 from the information processing device 2, the user terminal 3 runs the browser 45 on the controller 10 (process P44). The browser 45 acquires the contents based on the address contained in the browser start up instruction 59 (process P45). The user terminal 3 performs the display process of the browser screen image G3 showing the contents acquired by the browser 45 (process P46).

Figure 11:
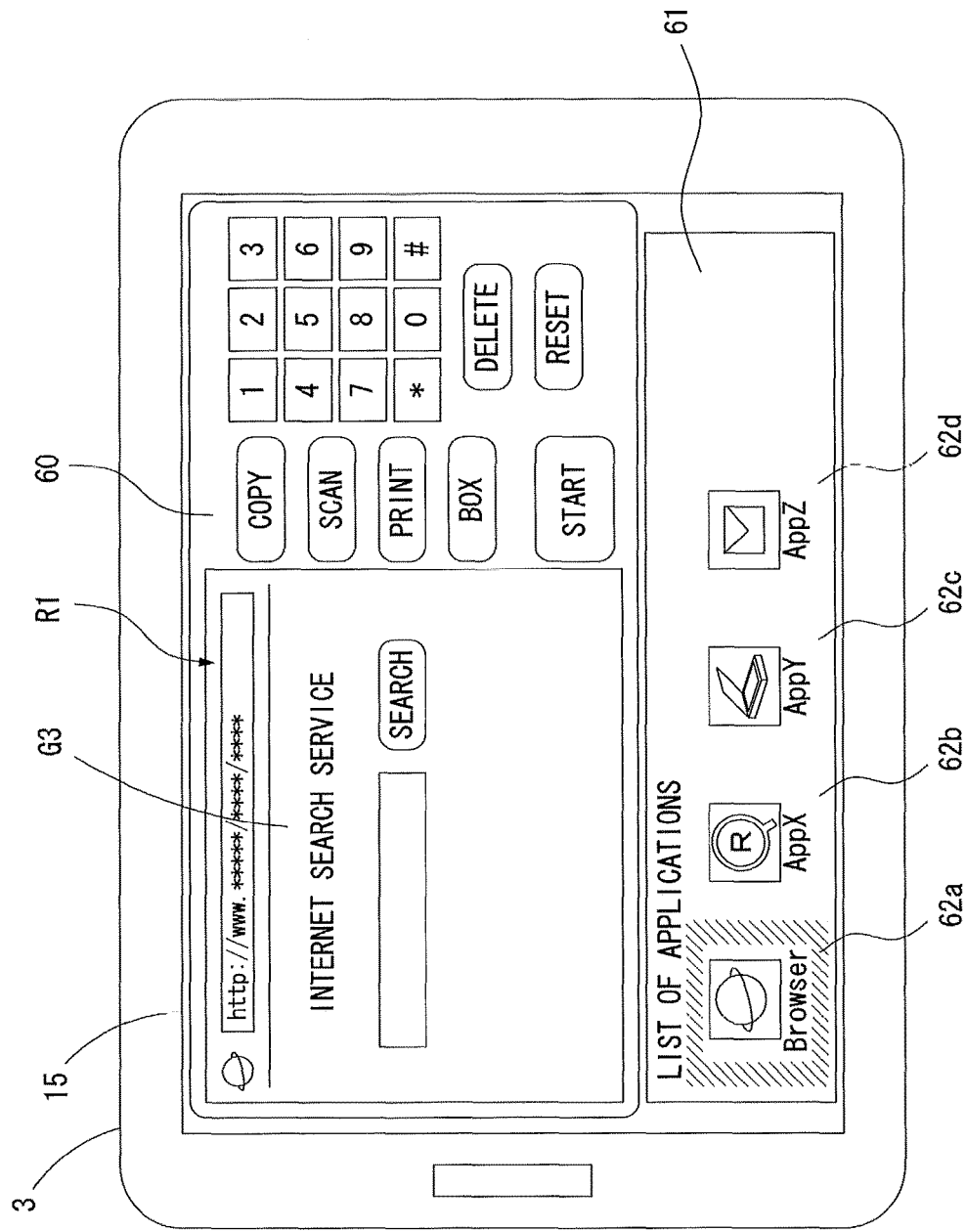
FIG. 11 is an example of the remote operation screen image displayed with the user terminal with a second browser running on the user terminal.

FIG. 11 is an example of the remote operation screen image displayed with the user terminal 3 with the browser 45 running on the user terminal 3. As illustrated in FIG. 11, the user terminal 3 displays the browser screen image G3 showing the contents acquired by the browser 45 in the display region R1 of the remote operation screen image after running the browser 45 inside. The browser screen image G3 displayed in the display region R1 shows the contents acquired by the browser 45 as they are. When the contents acquired by the browser 45 are the text data, the text data is displayed as it is as the browser screen image G3. As a result, the user operates the browser screen image G3 so that he or she is allowed to take only the text data shown as the browser screen image G3 out to copy and paste the data.

Referring back to FIG. 10, after detecting the operation on the browser screen image G3 displayed by the browser 45, the user terminal 3 causes the browser 45 to acquire again the contents based on the operation (process P48). With the browser screen image G3 updated by the browser 45, the display of the display region R1 is updated (process P49).

The user is also allowed to find data on the internet such as the document to print and download the found data, for example, by making the operation on the browser screen image G3 displayed in the display region R1. In this case, the browser 45 run on the user terminal 3 acquires the contents on the internet so that the contents may be displayed smoothly. The information processing device 2 is not required to acquire the contents from outside in response to the request from the user terminal 3. Even when the operational panel 8 of the information processing device 2 is operated and an instruction to produce the copied output of the document, for example, is given by another user, the information processing device 2 is allowed to smoothly execute the process requested by another user.

Figure 12:
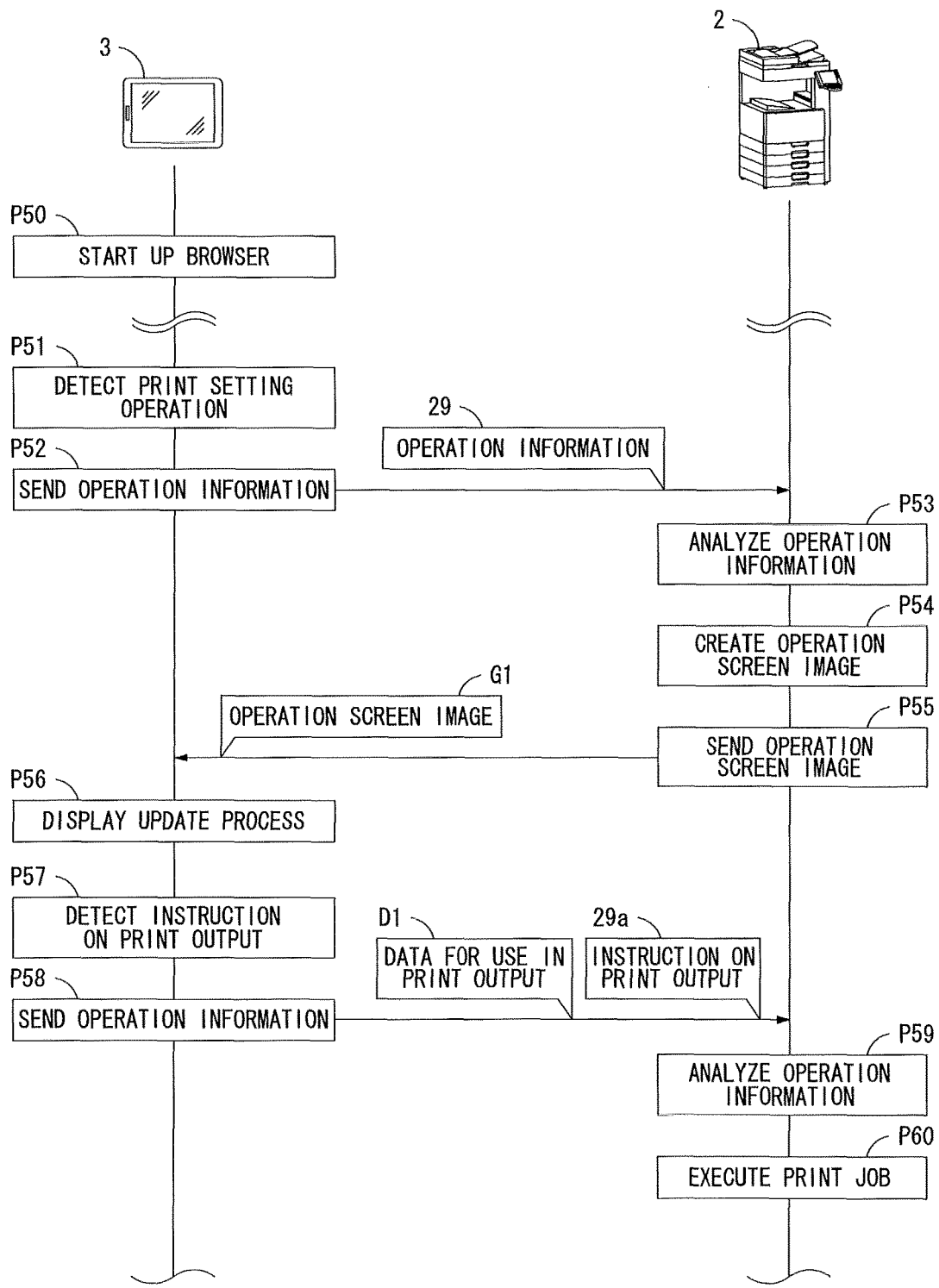
FIG. 12 is a flow diagram explaining an exemplary sequential procedure when an instruction on print output of a browser screen image is given by a user with the second browser running on the user terminal.

FIG. 12 is a flow diagram explaining an exemplary sequential procedure when the instruction on print output of the browser screen image G3 is given by the user with the browser 45 running on the user terminal 3. As shown in FIG. 12, the browser 45 is started up on the user terminal 3 (process P50). The user terminal 3 then detects the print setting operation by the user (process P51). In response to detecting the operation, the user terminal 3 sends the operation information 29 based on the detected operation to the information processing device 2 (process P52). In response to receipt of the operation information 29, the information processing device 2 analyzes the received operation information 29 (process P53) and creates the operation screen image G1 for print settings (process P54). The information processing device 2 sends the created operation screen image G1 to the user terminal 3 (process P55).

Figure 13:
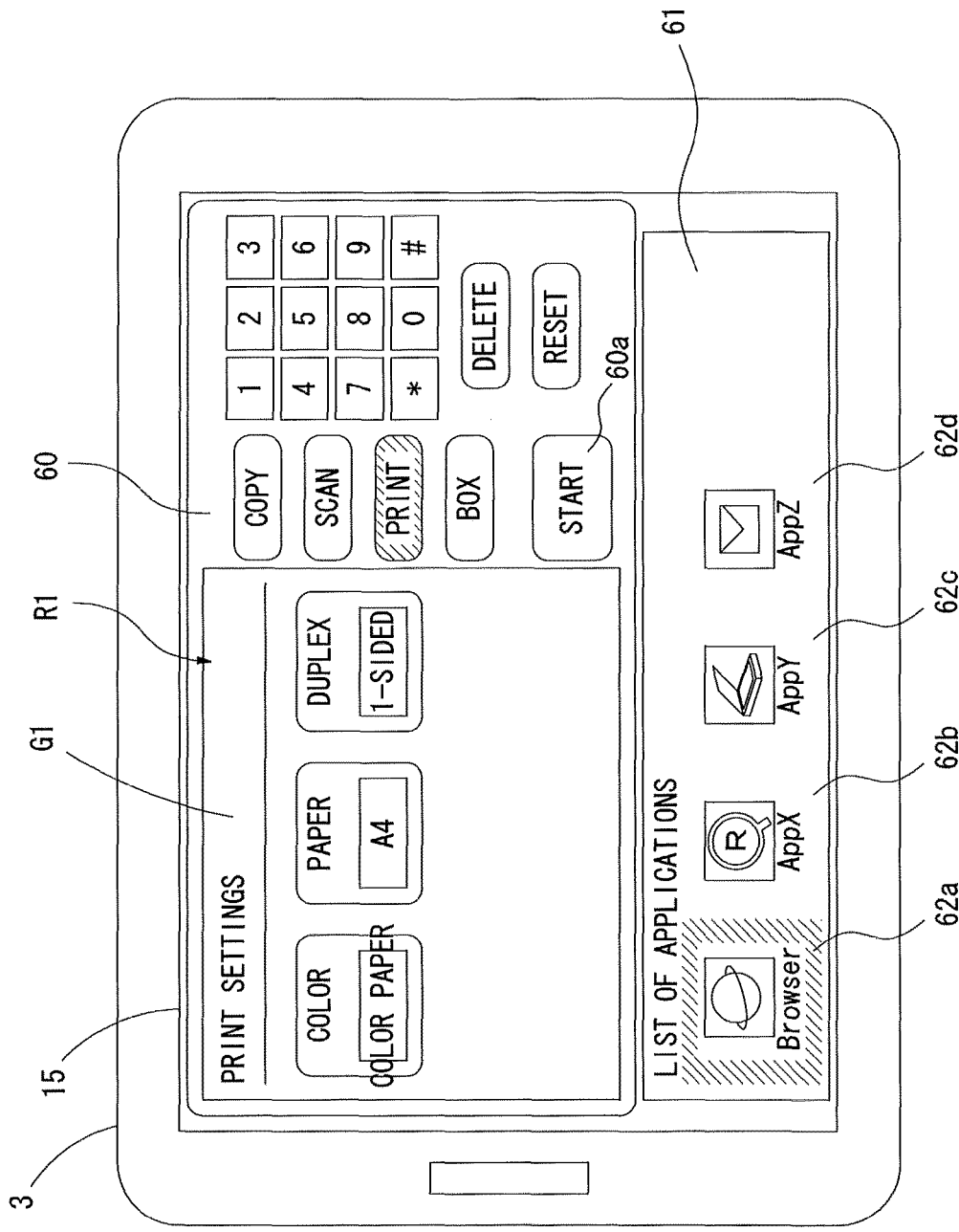
FIG. 13 is an example of the remote operation screen image with an operation screen image for print setting being displayed.

After receiving the operation screen image G1 for the print settings from the information processing device 2, the user terminal 3 displays the received operation screen image G1 in the display region R1 (process P56). FIG. 13 is an example of the remote operation screen image with the operation screen image G1 for print settings being displayed. With the operation screen image G1 for print settings being displayed with the user terminal 3, the user is allowed to configure the print settings on the information processing device 2. After configuring the print settings, a start key 60a is pressed by the user, and the instruction to start print output may be given to the information processing device 2.

Referring back to FIG. 12, after detecting the instruction on print output by the user (process P57), the user terminal 3 generates the operation information 29 corresponds to the operation. The user terminal 3 generates data for print output D1 showing the contents acquired by the browser 45 laid out together with the operation information 29. The user terminal 3 sends the generated data for print output D1 to the information processing device 2 together with the operation information 29 (process P58).

The information processing device 2 analyzes the operation information 29 received from the user terminal 3 (process P59). If the received operation information 29 is the instruction on print output by the user as a result of the analysis, the information processing device 2 starts executing the print job based on the data for print output D1 received together with the instruction on print output (process P60).

As described above, according to the present preferred embodiment, in response to the instruction on print output by the user while the browser 45 is running on the user terminal 3, the data for print output D1 based on the browser screen image displayed by the browser 45 is sent to the information processing device 2. More specifically, the data (contents) to print is not stored in the information processing device 2 while the browser 45 is running on the user terminal 3. The user terminal 3, therefore, sends the data for print output D1 to the information processing device 2 together with the instruction on print output. While the browser 57 is running on the information processing device 2, the information processing device 2 has stored therein the data (contents) to print. In this case, it is not required to have the data for print output D1 sent from the user terminal 3 to the information processing device 2. Therefore, only the operation information 29 containing the instruction on print output is sent to the information processing device 2.

Figure 14:
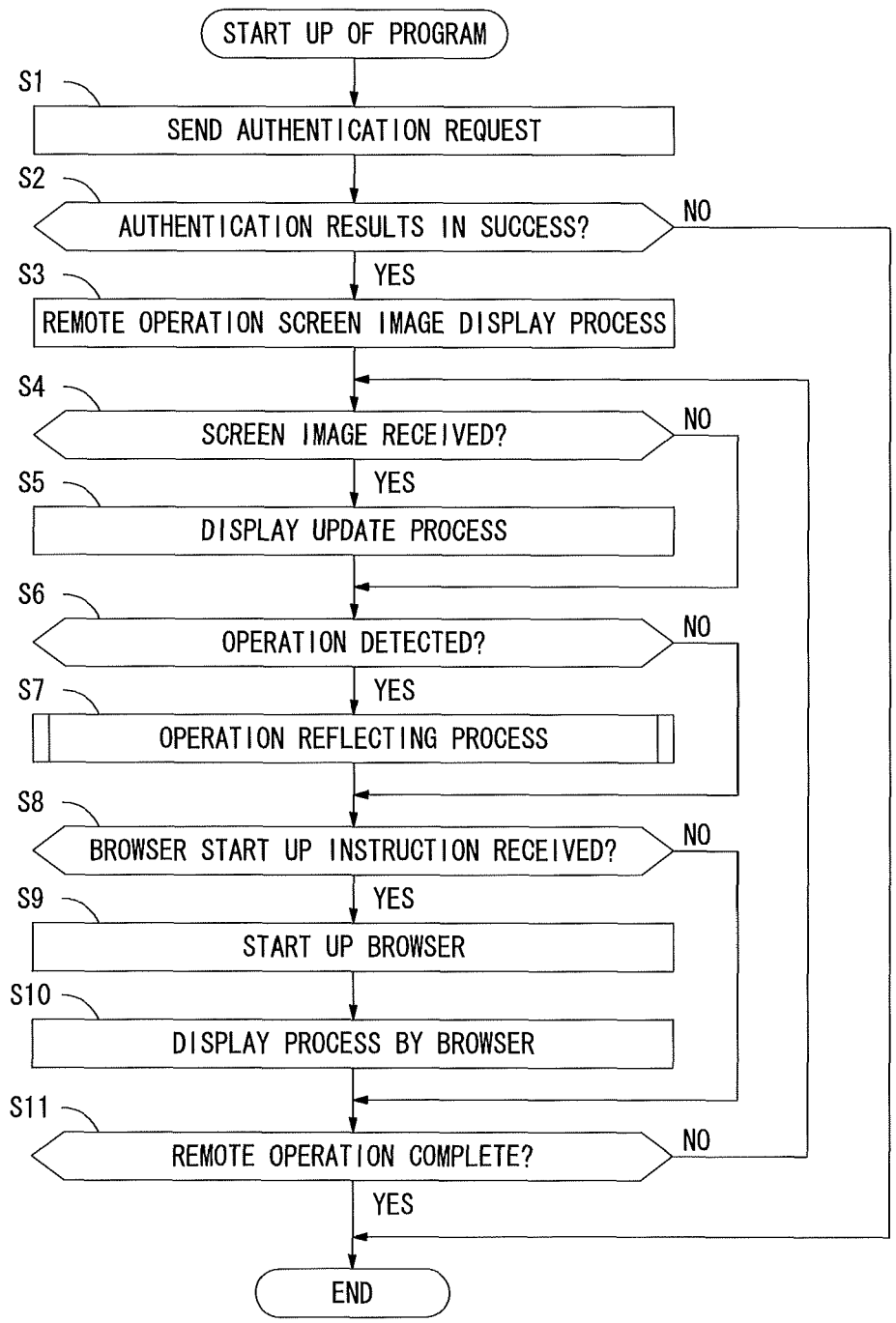
FIG. 14 is a flow diagram explaining an exemplary sequential procedure of the process performed on the user terminal.
Figure 15:
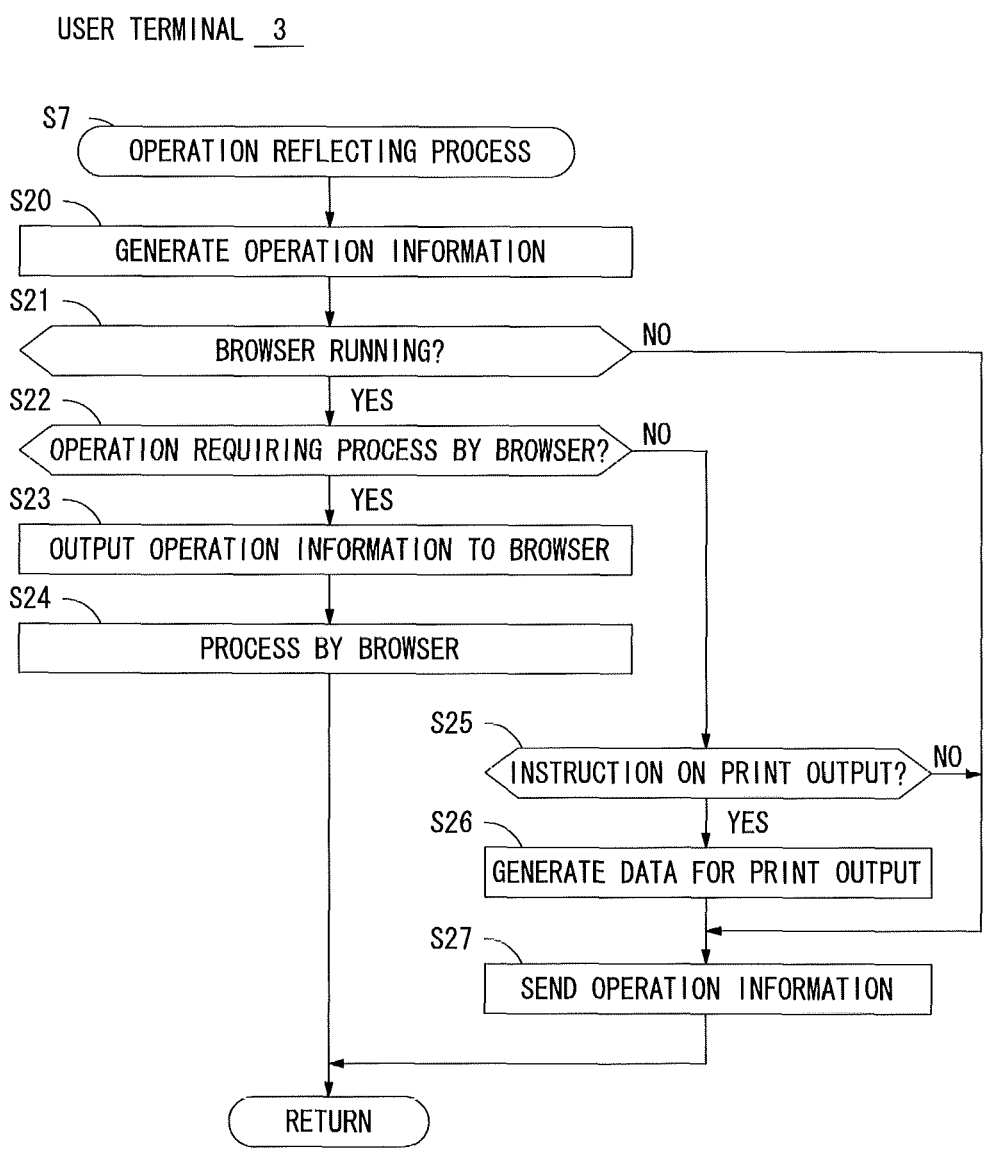
FIG. 15 is a flow diagram explaining the detailed exemplary sequential procedure of an operation reflecting process.

The detailed sequential procedure on the user terminal 3 is described next. FIGS. 14 and 15 are flow diagrams explaining exemplary sequential procedures of the process performed on the user terminal 3. Upon the start up of the remote control program 21, the user terminal 3 sends the authentication request to the information processing device 2 (step S1). As receiving the authentication request, the information processing device 2 performs the authentication process. The user terminal 3 then receives the authentication result from the information processing device 2. In response to receipt of the authentication result from the information processing device 2, the user terminal 3 determines whether or not the authentication results in success (step S2). When the authentication results in failure (when a result in step S2 is NO), the process is complete. When the authentication results in success (when a result in step S2 is YES), the user terminal 3 moves on to the process after step S3.

If the authentication results in success, the user terminal 3 remotely logs into the information processing device 2 and performs the remote operation screen image display process (step S3). The user terminal 3 displays the operation screen image G1 received from the information processing device 2 in the display region R1 and the list of the applications in the list of applications 61 according to the information regarding the applications received from the information processing device 2. As a result of this display process, the remote operation screen image as illustrated in FIG. 7 is displayed on the display unit 15 of the user terminal 3.

The user terminal 3 repeatedly performs the process in steps S4 to S10 until completion of the remote operation is instructed by the user. The user terminal 3 firstly determines whether or not the new screen image is received from the information processing device 2 in the process repeatedly performed (step S4). When the new screen image is received, the user terminal 3 updates the screen image displayed in the display region R1 to the received new screen image and displays the updated screen image (step S5). If there is no new screen image received, the process in step S5 is skipped.

The user terminal 3 then determines whether or not the user's operation is detected (step S6). In response to detecting the user's operation, the operation reflecting process is performed (step S7).

FIG. 15 is a flow diagram explaining the detailed exemplary sequential procedure of the operation reflecting process. Upon the start of the operation reflecting process, the user terminal 3 generates the operation information 29 corresponds to the user's operation (step S20). The user terminal 3 determines whether or not the browser 45 is running on the user terminal 3 (step S21). The browser 45 may not be running on the user terminal 3 (when a result of step S21 is NO). In such a case, the user terminal 3 sends the operation information 29 to the information processing device 2 (step S27) and completes the operation reflecting process. When, for example, the application start up instruction is given by the user after one of the applications is selected, the operation information 29 indicating the start up of the application is sent to the information processing device 2 and the operation reflecting process is complete.

The browser 45 may be running on the user terminal 3 (when a result of step S21 is YES). In such a case, the user terminal 3 determines if the user's operation requires the process by the browser 45 (step S22). If the user's operation requires the process by the browser 45 (when a result of step S22 is YES), the user terminal 3 outputs the operation information 29 to the browser 45 (step S23) and makes the browser 45 perform the process (step S24). So, in this case, the browser 45 running on the user terminal 3 performs the process to update the contents such as the web page in response to the user's operation. After the process by the browser 45, the operation reflecting process is complete.

If the user's operation does not require the process by the browser 45 (when a result of step S22 is NO), the user terminal 3 determines whether or not the user's operation is to give the instruction on print output (step S25). When the user's operation is to give the instruction on print output (when a result of step S25 is YES), the user terminal 3 generates the data for print output D1 based on the browser screen image G3 displayed by the browser 45 in the display region R1 (step S26). When the user's operation is not to give the instruction on print output (when a result of step S25 is NO), the process in step S26 is skipped. The user terminal 3 then sends the operation information 29 generated in step S20 to the information processing device 2 (step S27). The data for print output D1 may be generated in step S26. In this case, the user terminal 3 sends the data for print output D1 to the information processing device 2 together with the operation information 29. Thus, the operation reflecting process is complete.

Referring back to FIG. 14, when user's operation is not detected in step S6, the above-described operation reflecting process (step S7) is not performed.

The user terminal 3 determines whether or not the browser start up instruction is received from the information processing device 2 (step S8). With the browser start up instruction received (when a result of step S8 is YES), the user terminal 3 executes the browser program 22, thereby starting up the browser 45 on the user terminal 3 (step S9). Upon the start up of the browser 45, the contents acquiring process by the browser 45 and the contents display process are performed (step S10). If no browser start up instruction is received from the information processing device 2, the process in steps S9 and S10 is skipped.

The user terminal 3 then determines whether or not the instruction to complete remote operation by the user is received (step S11). When the instruction to complete remote operation is not received, the user terminal 3 repeatedly performs the above-described process by returning to the process in step S4. In response to the instruction to complete remote operation by the user (when a result of step S11 is YES), the user terminal 3 logs out the information processing device 2 and completes the execution of the remote control program 21.

Figure 16:
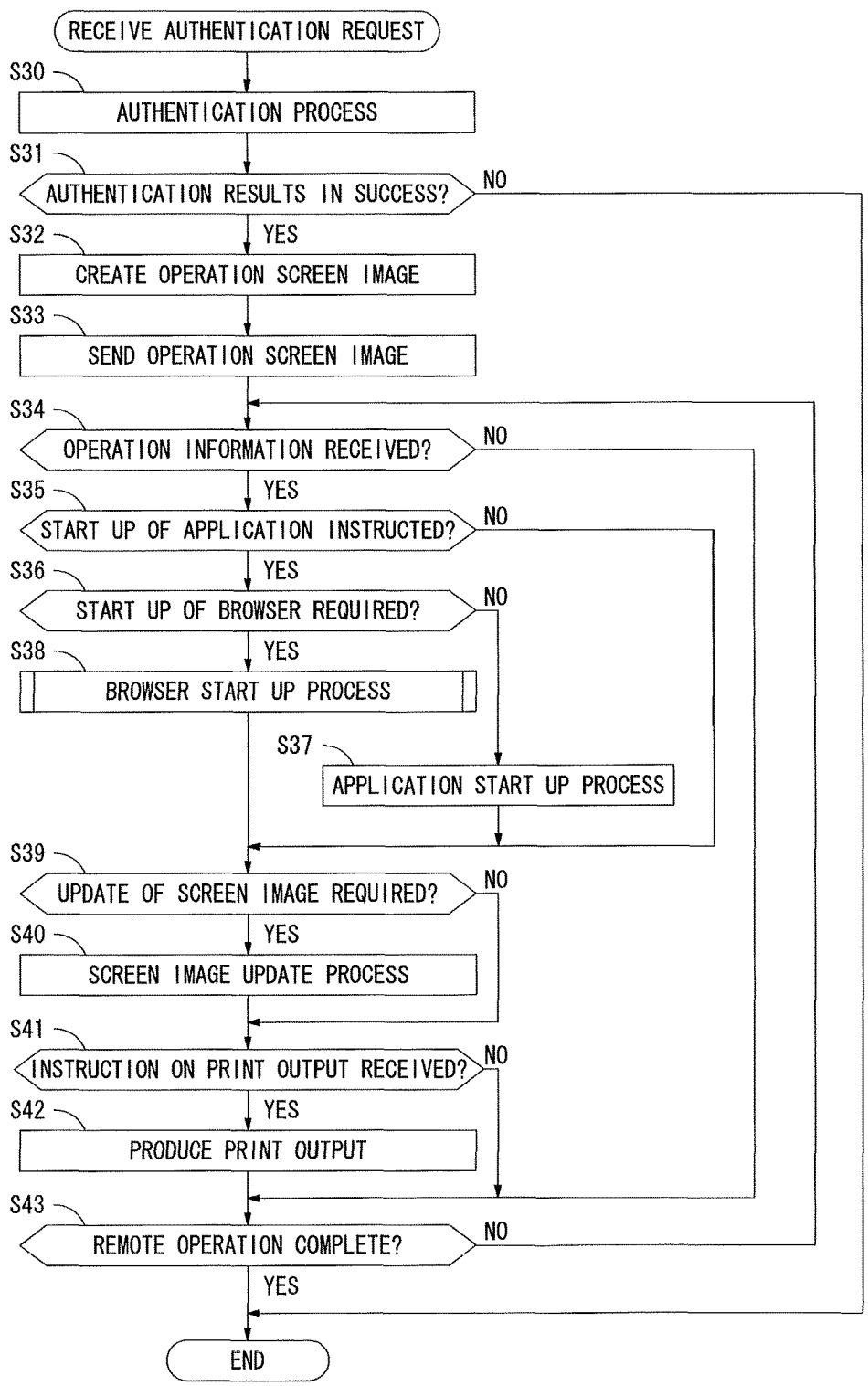
FIG. 16 is a flow diagram explaining an exemplary sequential procedure of the process performed on the information processing device.
Figure 17:
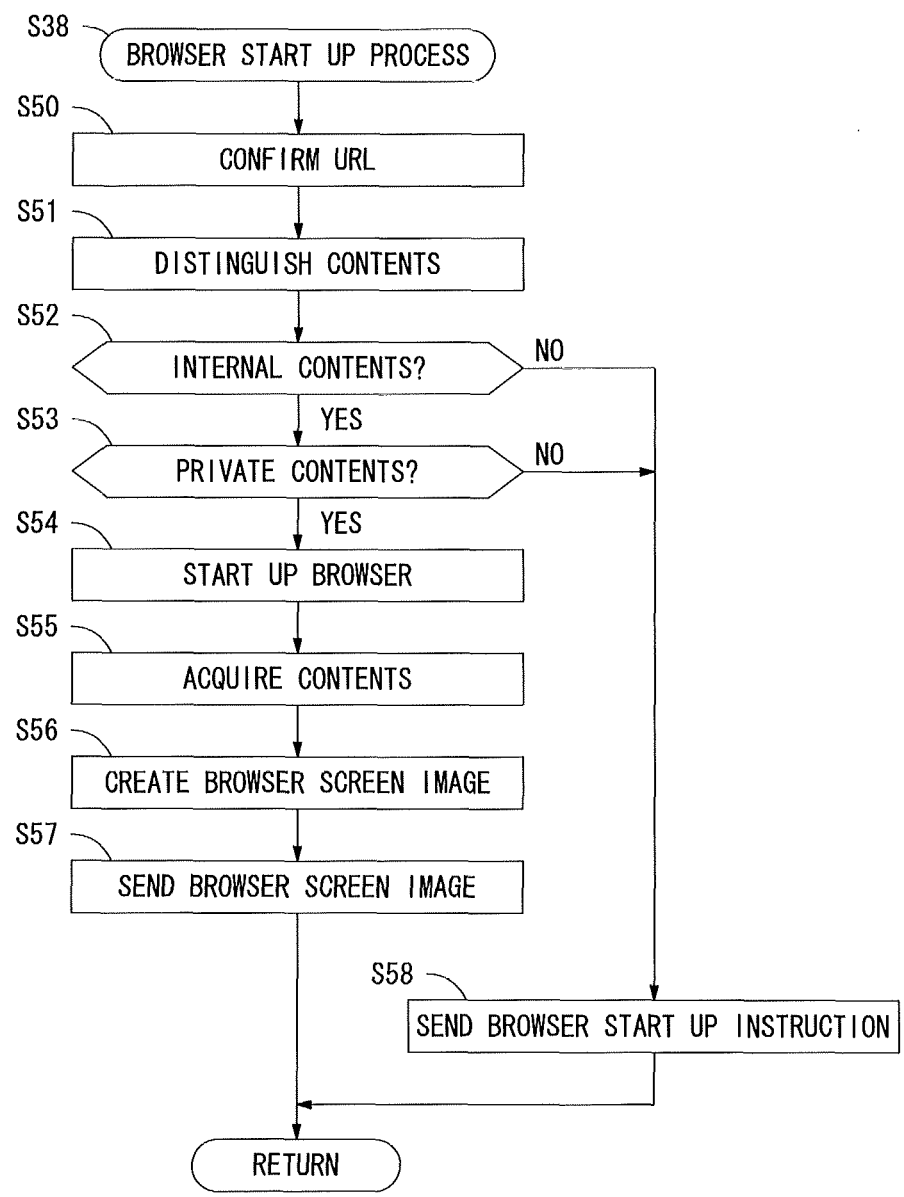
FIG. 17 is a flow diagram explaining the detailed exemplary sequential procedure of a browser start up process.

Next, the detailed sequential procedure of the process performed on the information processing device 2 is described. FIGS. 16 and 17 are flow diagrams explaining exemplary sequential procedures of the process performed on the information processing device 2. This process is started upon the receipt of the authentication request from the user terminal 3 by the information processing device 2. As receiving the authentication request, the information processing device 2 extracts the user information 23 contained in the authentication request and performs the authentication process (step S30). If the authentication results in success (when a result of step S30 is YES), the information processing device 2 is put into a remote logged-in state in which the user terminal 3 is remotely logging in and moves on to the process after step S32. If the authentication results in failure (when a result of step S30 is NO), the information processing device 2 completes the process.

As the information processing device 2 is put into the remote logged-in state in which the user terminal 3 is remotely logging in, it creates the operation screen image G1 to operate a function such as copy function, for example, as an initial screen image for remote operation (step S32) and sends the created operation screen image G1 to the information processing device 2 (step S33).

The information processing device 2 then determines if the operation information 29 is received from the user terminal 3 (step S34). In response to receipt of the operation information 29 from the user terminal 3 (when a result of step S34 is YES), the information processing device 2 determines whether or not the received operation information 29 instructs start up of the application (step S35). With the operation information 29 instructing start up of the application, the information processing device 2 further determines if the application requires start up of the browser 57 (step S36). When the application instructed to start up does not require start up of the browser 57 (when a result of step S36 is NO), the information processing device 2 performs the application start up process to activate the application specified by the user (step S37). When the application instructed to start up requires start up of the browser 57 (when a result of step S36 is YES), the information processing device 2 performs the browser start up process (step S38).

FIG. 17 is a flow diagram explaining the detailed exemplary sequential procedure of the browser start up process (step S38). As shown in FIG. 17, upon the start of the browser start up process, the information processing device 2 confirms the address such as URL contained in the operation infonnation 29 received from the user terminal 3 (step S50) and distinguishes the contents to be accessed by the browser 57 (step S51). More specifically, the information processing device 2 determines whether or not the contents to be accessed by the browser 57 are the internal contents 39 (step S52). When the internal contents 39 are to be accessed by the browser 57 (when a result of step S52 is YES), the information processing device 2 further determines if the internal contents 39 to be accessed by the browser 57 are the private contents (step S53).

When the contents to be accessed by the browser 57 are the internal contents 39 (when a result of step S52 is YES) and the internal contents 39 are the private contents (when a result of step S53 is YES), the information processing device 2 starts the browser 57 up (step S54). The information processing device 2 then acquires the internal contents 39 with the running browser 57 (step S55) and creates the browser screen image (step S56). The information processing device 2 converts the browser screen image created by the browser 57 to data such as a bit map image and sends to the user terminal 3 (step S57).

When the contents to be accessed by the browser 57 are the external contents (when a result of step S52 is NO) or the contents to be accessed by the browser 57 are the internal contents 39 but the open contents (when a result of step S53 is NO), the information processing device 2 does not start the browser 57 up. In this case, the information processing device 2 sends the browser start up instruction to the user terminal 3 (step S58). Thus, the browser start up process (step S38) is complete.

Referring back to FIG. 16, the information processing device 2 determines if update of the operation screen image G1 or the browser screen image G2 is required based on the operation information 29 received from the user terminal 3 (step S39). If the update of the screen image is required, the screen image update process is performed next (step S40).

The information processing device 2 determines whether or not the operation information 29 received from the user terminal 3 is the instruction on print output (step S41). When receiving the instruction on print output (when a result of step S41 is YES), the information processing device 2 drives the image forming section 7 to produce the print output (step S42). If the information processing device 2 has received the data for print output D1 from the user terminal 3, the information processing device 2 produces the print output based on the received data for print output D1.

The information processing device 2 then repeatedly performs the above-described process by returning to step S34 to perform the process based on the operation information 29 until the instruction to complete remote operation is received from the user terminal 3. In response to the instruction to complete remote operation from the user terminal 3 (when a result of step S43 is YES), the process is complete As described above, on the information processing system 1 of the present preferred embodiment, the user terminal 3 and the information processing device 2 are allowed to establish communication therebetween, and the information processing device 2 may be operated by remote control via the user terminal 3 by displaying the remote operation screen image for remote operation of the information processing device 2 with the user terminal 3.

The information processing device 2 of the present preferred embodiment creates the operation screen image G1 that is to be displayed with the user terminal 3 and sends the created operation screen image G1 to the user terminal 3. The information processing device 2 then receives the operation information 29 corresponding to operation made through the operation screen image G1 from the user terminal 3. In response to receipt of the operation information 29, that is the process request requiring the start up of the browser, from the user terminal 3, the information processing device 2 determines if the contents accessed by the browser to be run are the internal contents 39 of the information processing device 2. If it is determined that the contents are the internal contents 39, the first browser 57 is run on the information processing device 2. The information processing device 2 then causes the first browser 57 to create the browser screen image (display screen image) showing the internal contents 39 and sends the created browser screen image to the user terminal 3. When it is determined that the contents to be accessed by the browser are the external contents, the information processing device 2 sends the browser start up instruction to make the second browser 45 installed on the user terminal 3 start up to the user terminal 3.

The user terminal 3 of the present preferred embodiment causes the operation screen image G1 received from the information processing device 2 to be displayed on the display unit 15 and sends the operation information according to the user's operation to the information processing device 2 with displaying the remote operation screen image on the display unit 15. The user terminal 3 may receive the browser start up instruction from the information processing device 2 after sending the operation information 29. In such a case, the user terminal 3 runs the second browser 45 on the user terminal 3 and causes the browser screen image (display screen image) showing the external contents acquired via the second browser 45 to be displayed on the display unit 15.

According to the information processing system 1 of the present preferred embodiment, the information processing device 2 runs the browser 57 installed on the information processing device 2 if the contents acquired by the browser are the internal contents 39 of the information processing device 2 to start up the browser while it is being operated by remote control via the user terminal 3. The internal contents 39 of the information processing device 2, therefore, may be prevented from being acquired by the external browser. As a result, the internal contents 39 of the information processing device 2 can be prevented from being used as they are on the external device. This results in ensured security for the internal contents 39 of the information processing device 2.

According to the present preferred embodiment, if the contents acquired by the browser are the external contents that are stored outside the information processing device 2, the information processing device 2 does not start the browser 57 up by itself. Instead of starting the browser 57 up by itself, the information processing device 2 sends the browser start up instruction to the user terminal 3 to cause the user terminal 3 to start the browser 45 up. When the user operating the user terminal 3 browses the internet by starting the browser up, for example, the browser 57 is not run on the information processing device 2. In this case, the browser 45 runs on the user terminal 3 and the user terminal 3 directly acquires the external contents over the network 4 without the information processing device 2 and displays the acquired contents. The images of the external contents may be displayed with the user terminal 3 smoothly and the operation efficiency in internet browsing may be improved. Also, the information processing device 2 is even allowed to rapidly execute jobs such as the print job, execution of which is instructed by another user, for example, because the information processing device 2 is not necessary to acquire the external contents instead of the user terminal 3. This results in improvement of process efficiency.

The contents to be accessed by the browser may be the internal contents 39. In the present preferred embodiment, the information processing device 2 determines if the internal contents 39 to be accessed by the browser are the private internal contents which are the access restricted internal contents and are not acquired via the access from outside, or the open internal contents which are openly available and access to which is not restricted. When it is determined that the internal contents 39 are the private internal contents 39, the first browser 57 is run on the information processing device 2. When it is determined that the internal contents 39 are the open internal contents 39, the information processing device 2 sends the browser start up instruction to the user terminal 3.

To be more specific, the contents accessed by the browser may be the internal contents 39 of the information processing device 2 and the private internal contents which are the access restricted internal contents and are not acquired via the access from outside. In this case, the information processing device 2 starts its browser 57 up and causes the browser screen image (display screen image) based on the internal contents 39 to be displayed with the user terminal 3 by function of the browser 57. As a result, the private internal contents 39 stored in the information processing device 2 may be preferably prevented from being acquired by the external browser. This realizes the ensured well security for the private internal contents 39.

The contents accessed by the browser may be the internal contents 39 of the information processing device 2 but the internal contents 39 are the open internal contents 39. In this case, the browser 57 of the information processing device 2 is not started up and the browser 45 of the user terminal 3 is started up. The browser 45 run on the user terminal 3 acquires the internal contents 39 of the information processing device 2 and displays the acquired contents. The contents acquiring process and the display process for the open internal contents 39 stored in the information processing device 2 are performed on the user terminal 3. Thus, the performance reduction may be further controlled effectively for the user terminal 3 and the information processing device 2.

According to the present preferred embodiment, the second browser 45 is started up on the user terminal 3. With the start up of the browser, the browser screen image G3 (display screen image) showing the external contents acquired by the second browser 45 are displayed as a part of the remote operation screen image displayed on the display unit 15 as shown in FIG. 11. More specifically, the second browser 45 started up on the user terminal 3 is not the function independent of the remote controlling part 42. The second browser 45 is a part of the functions of the remote controlling part 42 to display the browser screen image G3 showing the acquired external contents laid out on the remote operation screen image displayed on the display unit 15 in response to the start up of the browser 45. Even when the second browser 45 is started up on the user terminal 3, the user is allowed to continue remote operation without switching the window or the screen. Especially, the user terminal 3 can continue displaying a menu to select functions on the information processing device 2 or the list of applications 61 to select the application even after starting up the second browser 45. The user is allowed to operate the information processing device 2 by remote control with browsing the internet, for example, resulting in improvement in operability.

In the present preferred embodiment, the instruction on print output may be given by the user with the browser screen image G3 showing the external contents acquired by the second browser 45 being displayed on the display unit 15 of the user terminal 3. In such a case, the user terminal 3 generates the data for print output D1 based on the browser screen image G3 and sends the generated data for print output D1 to the information processing device 2 together with the instruction on print output. More specifically, while the second browser 45 is running on the user terminal 3, the data to print is not stored in the information processing device 2. The user terminal 3, therefore, is configured to send the data for print output D1 to the information processing device 2 together with the instruction on print output. The instruction on print output based on the browser screen image G3 displayed by the second browser 45 may be given by the user even when the second browser 45 runs on the user terminal 3. Even in this case, the information processing device 2 is allowed to acquire the data for print output D1 from the user terminal 3 and produce the print output normally.

As described above, for operating the information processing device by remote control via the user terminal, performance reduction accompanied with browser start up may be controlled and security of internal contents of the information processing device may be ensured.

(Modifications)

While the preferred embodiment of the present invention has been described above, the present invention is not limited to the preferred embodiment. Various modifications may be applied to the present invention.

In the present preferred embodiment described above, the information processing device 2 is shown to be one of MFPs with multiple functions such as scan function, print function and BOX function, for example. The information processing device of the present invention is not necessarily the device such as the MFPs including multiple functions.

In the above-described present preferred embodiment, the user terminal 3 and the information processing device 2 establish communication over the network 4 such as LAN. It is not limited to the communication established over the network 4. More specifically, for example, the user terminal 3 and the information processing device 2 may establish short distance wireless communication such as NFC (Near Field Communication) one-to-one, thereby establishing communication for remote operation.

What is claimed is:

1. An information processing system comprising a user terminal and an information processing device that allow communication therebetween, a remote operation screen image for remotely operating said information processing device being displayed with said user terminal so that said information processing device is operated by remote control via said user terminal, wherein
said information processing device includes:
a processor that:
creates the remote operation screen image to be displayed with said user terminal and sends the created remote operation screen image to said user terminal, and receives operation information based on an operation made on the remote operation screen image from said user terminal;
determines whether or not contents accessed by a browser to be run are internal contents stored in said information processing device or external contents stored outside the information processing device when the operation information received from said user terminal is a process request requiring start up of the browser; and
starts up a first browser on said information processing device, creates a display screen image displayed with said user terminal based on a display screen image showing the internal contents displayed by said first browser and sends the display screen image to said user terminal when it is determined that the internal contents are to be accessed, and sends a browser start up instruction to said user terminal and an instruction to acquire the external contents without going through said first browser after causing said user terminal to start up a second browser installed on said user terminal when it is determined that the external contents stored outside the information processing device are to be accessed, and
said user terminal includes:
a display part on which a variety of information is displayed; and
a processor that:
causes the remote operation screen image received from said information processing device to be displayed on said display part, and sends the operation information including the operation to start up said first browser on said information processing device based on user's operation to said information processing device with the remote operation screen image being displayed on said display part;
displays the display screen image on said display part when the display screen image that is created in response to the internal contents stored in said information processing device is received from said information processing device after sending said operation information; and
starts up said second browser on said user terminal and causes a display screen image showing the external contents stored outside said information processing device and acquired by said running second browser without going through said first browser to be displayed on said display part in response to receiving said browser start up instruction from said information processing device after sending the operation information.

2. The information processing system according to claim 1, wherein
said processor of said information processing device further determines if the internal contents are private internal contents which are access restricted internal contents and are not acquired directly via access from outside the information processing device or open internal contents which are openly available and access to said open internal contacts from outside is not restricted when the contents accessed by the first browser are the internal contents, and
said processor of said information processing device starts said first browser up on said information processing device when it is determined that the internal contents to be accessed are the private internal contents, and sending said browser start up instruction to said user terminal when it is determined that the internal contents to be accessed are the open internal contents.

3. The information processing system according to claim 1, wherein
said processor of said user terminal causes the display screen image showing the external contents acquired by said second browser to be displayed on said display part as a part of the remote operation screen image in response to start up of said second browser.

4. The information processing system according to claim 1, wherein
said processor of said user terminal sends an instruction on print output to said information processing device in response to receiving an instruction on print output by a user with the remote operation screen image being displayed on said display part, and
said information processing device further includes:
an image forming part for producing print output based on the remote operation screen image being displayed with said user terminal in response to receiving said instruction on print output.

5. The information processing system according to claim 4, wherein
said processor of said user terminal generates data for print output based on the display screen image showing the external contents acquired by said second browser and sends the generated data for print output to said information processing device together with said instruction on print output in response to receiving said instruction on print output by the user with the display screen image being displayed on said display part, and
said image forming part produces print output based on said data for print output received together with said instruction on print output.

6. The information processing system according to claim 1, wherein the processor of said information processing device sends the internal contents to said user terminal after converting the internal contents into another data different from original data of the internal contents when the contents accessed by the first browser to be run are the internal contents stored in said information processing device.

7. The information processing system according to claim 6, wherein the processor in said information processing device converts the internal contents into image data and then sends the image data to said user terminal.

8. A user terminal capable of establishing communication with an information processing device, said user terminal displaying a remote operation screen image for remotely operating said information processing device, thereby operating said information processing device by remote control, comprising:
a display part on which a variety of information is displayed; and a processor that:
  causes the remote operation screen image received from said information processing device to be displayed on said display part, and sends operation information including the operation to start up a first browser on said information processing device based on user's operation to said information processing device with the remote operation screen image being displayed on said display part;
  displays a display screen image on said display part when the display screen image is created in response to contents being internal contents stored in said information processing device and when the display screen image is received from said information processing device after sending said operation information; and
  starts up a second browser on said user terminal when the contents are external contents stored outside of said information processing device, and causes a display screen image showing the external contents stored outside said information processing device and acquired by said second browser without going through said first browser to be displayed on said display part in response to receiving a browser start up instruction from said information processing device when it is determined that the contents are the external contents stored outside the information processing device instead of the internal contents stored in the image processing device.

9. The user terminal according to claim 8, wherein
said processor causes the display screen image showing the contents acquired by said second browser to be displayed on said display part as a part of the remote operation screen image in response to start up of said second browser.

10. The user terminal according to claim 8, wherein
said processor sends an instruction on print output to said information processing device in response to receiving an instruction on print output by a user with the remote operation screen image being displayed on said display part.

11. The user terminal according to claim 10, wherein
said processor generates data for print output based on the display screen image showing the external contents acquired by said second browser and sends the generated data for print output to said information processing device together with said instruction on print output in response to receiving said instruction on print output by the user with the display screen image being displayed on said display part.

12. The user terminal according to claim 8, wherein the processor in said information processing device sends the internal contents to said user terminal after converting the internal contents into another data different from original data of the internal contents when the contents accessed by the first browser to be run are the internal contents stored in said information processing device.

13. The user terminal according to claim 12, wherein the processor in said information processing device converts the internal contents into image data and then sends the image data to said user terminal.

14. An information processing device capable of establishing communication with a user terminal, said information processing device causing a remote operation screen image to be displayed with said user terminal and receiving remote operation via said user terminal, thereby performing a variety of process, comprising:

a processor that:
  creates the remote operation screen image to be displayed with said user terminal and sends the created remote operation screen image to said user terminal, and receives operation information based on an operation made on the remote operation screen image from said user terminal;
  determines whether or not contents accessed by a first browser to be run are internal contents stored in said information processing device or external contents stored outside the information processing device when the operation information received from said user terminal is a process request requiring start up of the first browser; and
  starts up a first browser on said information processing device, creates a display screen image displayed with said user terminal based on a display screen image showing the internal contents displayed by said first browser and sends the display screen image to said user terminal when it is determined that the internal contents are to be accessed, and sends a browser start up instruction to said user terminal and an instruction to acquire the external contents without going through said first browser after causing said user terminal to start up a second browser installed on said user terminal when it is determined that the external contents stored outside the information processing device are to be accessed.

15. The information processing device according to claim 14, wherein
said processor further determines if the internal contents are private internal contents which are access restricted internal contents and are not acquired directly via access from outside the information processing device or open internal contents which are openly available and access to said open internal contacts from outside is not restricted when the contents accessed by the first browser are the internal contents, and
said processor starts said first browser up on said information processing device when it is determined that the internal contents to be accessed are the private internal contents, and sending said browser start up instruction to said user terminal when it is determined that the internal contents to be accessed are the open internal contents.

16. The information processing device according to claim 14, further comprising:
an image forming part for producing print output based on the remote operation screen image being displayed with said user terminal in response to receiving an instruction on print output.

17. The information processing device according to claim 16, wherein
said image forming part produces print output based on data for print output received together with said instruction on print output in response to receiving said data for print output.

18. The information processing device according to claim 14, wherein the processor in said information processing device sends the internal contents to said user terminal after converting the internal contents into another data different from original data of the internal contents when the contents accessed by the first browser to be run are the internal contents stored in said information processing device.

19. The information processing device according to claim 18, wherein the processor in said information processing device converts the internal contents into image data and then sends the image data to said user terminal.

20. A non-transitory computer readable recording medium on which a program is recorded, said program executable on a user terminal capable of establishing communication with an information processing device, said program causing a remote operation screen image for remotely operating said information processing device to be displayed, thereby operating said information processing device by remote control, said program executed on said user terminal to:
　　cause the remote operation screen image received from said information processing device to be displayed, and send operation information including the operation to start up said first browser on said information processing device based on user's operation to said information processing device with the remote operation screen image being displayed;
　　displays a display screen image on a display part when the display screen image is created in response to contents being internal contents stored in said information processing device and when the display screen image is received from said information processing device after sending said operation information; and
　　starts up a second browser on said user terminal when the contents are external contents stored outside of said information processing device, and causes a display screen image showing the external contents stored outside said information processing device and acquired by said second browser without going through said first browser to be displayed in response to receiving a browser start up instruction from said information processing device when it is determined that the contents are the external contents stored outside the information processing device instead of the internal contents stored in the image processing device.

21. The non-transitory computer readable recording medium according to claim 20, wherein the program:
　　causes the display screen image showing the contents acquired by said second browser to be displayed as a part of the remote operation screen image in response to start up of said second browser.

22. The non-transitory computer readable recording medium according to claim 21, wherein the program:
　　sends an instruction on print output to said information processing device in response to receiving an instruction on print output by a user with the remote operation screen image being displayed.

23. The non-transitory computer readable recording medium according to claim 22, wherein the program:
　　generates data for print output based on the display screen image showing the external contents acquired by said second browser and sends the generated data for print output to said information processing device together with said instruction on print output in response to receiving said instruction on print output by the user with the display screen image being displayed.

24. The non-transitory computer readable recording medium according to claim 20, wherein the processor in said information processing device sends the internal contents to said user terminal after converting the internal contents into another data different from original data of the internal contents when the contents accessed by the first browser to be run are the internal contents stored in said information processing device.

25. The non-transitory computer readable recording medium according to claim 24, wherein the processor in said information processing device converts the internal contents into image data and then sends the image data to said user terminal.

26. A non-transitory computer readable recording medium on which a program is recorded, said program executable on an information processing device capable of establishing communication with a user terminal, said program causing a remote operation screen image to be displayed with said user terminal, thereby causing a variety of process to be performed in response to remote operation via said user terminal, said program executed on said information processing device to:
　　create the remote operation screen image to be displayed with said user terminal and send the created remote operation screen image to said user terminal, and receive operation information based on an operation made on the remote operation screen image from said user terminal;
　　determine whether or not contents accessed by a first browser to be run are internal contents stored in said information processing device or external contents stored outside the information processing device when the operation information received from said user terminal is a process request requiring start up of the first browser; and
　　start up a first browser on said information processing device, and create a display screen image displayed with said user terminal based on a display screen image showing the internal contents displayed by said first browser and send the display screen image to said user terminal when it is determined that the internal contents are to be accessed, and send a browser start up instruction to said user terminal and an instruction to acquire the external contents without going through said first browser after causing said user terminal to start up a second browser installed on said user terminal when it is determined that the external contents stored outside the information processing device are to be accessed.

27. The non-transitory computer readable recording medium according to claim 26, wherein the program
　　determines if the internal contents are private internal contents which are access restricted internal contents and are not acquired directly via access from outside the information processing device or open internal contents which are openly available and access to which from outside is not restricted when the contents accessed by the first browser are the internal contents, and
　　starts said first browser up on said information processing device when it is determined that the internal contents to be accessed are the private internal contents, and sends said browser start up instruction to said user terminal when it is determined that the internal contents to be accessed are the open internal contents.

28. The non-transitory computer readable recording medium according to claim 26, wherein the processor in said information processing device sends the internal contents to said user terminal after converting the internal contents into another data different from original data of the internal contents when the contents accessed by the first browser to be run are the internal contents stored in said information processing device.

29. The non-transitory computer readable recording medium according to claim 28, wherein the processor in said information processing device converts the internal contents into image data and then sends the image data to said user terminal.

* * * * *